US007865931B1

(12) United States Patent
Stone et al.

(10) Patent No.: US 7,865,931 B1
(45) Date of Patent: Jan. 4, 2011

(54) UNIVERSAL AUTHORIZATION AND ACCESS CONTROL SECURITY MEASURE FOR APPLICATIONS

(75) Inventors: Andrew Stone, Chicago, IL (US); Brett Cooper, Smyrna, GA (US); Christopher Miller, Chicago, IL (US); Timothy Daniel McCarthy, San Diego, CA (US); Clifford Randall Cannon, Encinitas, CA (US)

(73) Assignee: Accenture Global Services Limited, Dublin (IE)

( * ) Notice: Subject to any disclaimer, the term of this patent is extended or adjusted under 35 U.S.C. 154(b) by 1508 days.

(21) Appl. No.: 10/303,357

(22) Filed: Nov. 25, 2002

(51) Int. Cl.
G06F 17/00 (2006.01)
(52) U.S. Cl. ............... 726/1; 726/3; 726/4; 726/5; 726/6; 726/11; 726/12; 726/17; 726/21; 726/27; 726/28; 726/29; 726/30; 713/170; 713/171; 713/172
(58) Field of Classification Search .................. 726/1, 726/3–6, 12, 17, 21, 27–30, 23, 11; 713/717, 713/170–172
See application file for complete search history.

(56) References Cited

U.S. PATENT DOCUMENTS

| 5,455,953 | A | 10/1995 | Russell ................ 710/256 |
| 5,592,622 | A | 1/1997 | Isfeld et al. ............ 709/207 |
| 5,875,330 | A | 2/1999 | Goti ..................... 717/104 |
| 6,014,666 | A | 1/2000 | Helland et al. ............ 707/9 |
| 6,158,007 | A | 12/2000 | Moreh et al. ............ 726/1 |
| 6,185,682 | B1 | 2/2001 | Tang ..................... 713/168 |
| 6,185,689 | B1 | 2/2001 | Todd, Sr. et al. ......... 726/25 |
| 6,304,967 | B1 * | 10/2001 | Braddy ................. 713/150 |
| 6,510,236 | B1 * | 1/2003 | Crane et al. ............ 382/116 |
| 6,807,636 | B2 * | 10/2004 | Hartman et al. ......... 726/14 |
| 6,941,285 | B2 * | 9/2005 | Sarcanin ................. 705/67 |

(Continued)

FOREIGN PATENT DOCUMENTS

WO    WO 91/08543    6/1991

(Continued)

OTHER PUBLICATIONS http://en.wikipedia.org/wiki/Common_Gateway_Interface.*

(Continued)

Primary Examiner—Kambiz Zand
Assistant Examiner—Tongoc Tran
(74) Attorney, Agent, or Firm—Mannava & Kang, P.C.

(57) ABSTRACT

The invention provides a system that includes: a web server, an application server, and a data server all connected to each other. The system is intended to protect web based applications. A web server receives a request and transmits it as a message to the application server. When the application server receives the request, the application server extracts attributes of this request. The application server uses an authorization engine to determine if each attribute of the request is authorized by accessing the data server to compare each attribute of the request with at least one rule from a rules store. The rules store resides on the data server. If the attributes of the request meet the rules in the rules store, then the request is executed by the application server.

36 Claims, 21 Drawing Sheets

U.S. PATENT DOCUMENTS

| | | | | |
|---|---|---|---|---|
| 6,965,939 B2 * | 11/2005 | Cuomo et al. | ............... | 709/229 |
| 6,986,040 B1 * | 1/2006 | Kramer et al. | .............. | 713/155 |
| 7,016,875 B1 * | 3/2006 | Steele et al. | .................. | 705/44 |
| 7,039,804 B2 * | 5/2006 | Fichtner et al. | ............. | 713/169 |
| 2003/0120601 A1 * | 6/2003 | Ouye et al. | ................... | 705/51 |

FOREIGN PATENT DOCUMENTS

| | | |
|---|---|---|
| WO | WO 96/31828 | 10/1996 |

OTHER PUBLICATIONS http://en.wikipedia.org/wiki/Active_Server_Page.*
http://en.wikipedia.org/wiki/Java_servlet.*
http://en.wikipedia.org/wiki/JavaServer_pages.*
http://enwikipedia.org/wiki/Javascript.*
http://en.wikipedia.org/wiki/Corba.*
http://en.wikipedia.org/wiki/IIOP.*

* cited by examiner

UNIVERSAL AUTHORIZATION AND ACCESS CONTROL SECURITY MEASURE FOR APPLICATIONS

This invention relates generally to the field of computer network security systems. In particular, it presents a technique for controlling access to applications that perform useful functions in the processing of data through a centralized authorization system.

BACKGROUND OF THE INVENTION

An unprecedented number of electronic transactions are required to sustain a modern global economy. In order to protect the persons and companies performing these transactions, it has been necessary to provide authentication and authorization systems to provide security. A typical transaction normally requires: a data server, an application, and a user of the application. The data server may, for example, be a central mainframe computer at a bank containing account information, or a database server at a retailer containing customer information, or a file server for an accounting agency containing tax files. The application may be a program running on a personal computer (PC), a portable program running on a hand-held PC or personal digital assistant (PDA), or a web-based program running on the combination of a PC web-browser, web server, and application logic server. The application is usually connected or connectable via telecommunications to the data server. The user utilizes the application to generate action requests or messages which are transmitted to the data server. Actions will be performed on resources on the data server based on the contents of the request.

Unique information for the application and/or the user, such as a communication address, a user-id password combination, biometric information, or a security token uniquely identifies the user of the application. Whenever an action request is generated in the application, usually at the request of the user, this unique identification information is used to authenticate the user. Typically, the action request is authenticated by using an authentication algorithm to generate a digital token using the unique information. The authenticated information is sent to the data server along with the action request. The data server (or possibly web-server) uses the same authentication algorithm or a complementary authentication algorithm to verify the authenticity of the action request, and can grant or deny access for to the action based on the authentication information.

For certain application requests, such as an instruction given to a bank to transfer money from an account, it may be required to perform some form of access control that ensures only an authorized user can issue the instruction. The process of authorizing the user can be based on attributes of the user, attributes of the action request, or attributes of the resource the action is being performed on. Authorization typically requires that the user be authenticated. For other applications, it may not be required or, it may be undesirable to provide authorization access control for reasons of efficiency or performance.

Access control is the process of granting or denying an action based on authentication and authorization. Authentication is the process of verifying that a user is who he or she purports to be. Authorization is the process of determining whether a user is allowed to perform a requested action based on a set of pre-defined rules. Authorization is often reliant on authentication to ensure that a user is correctly identified. For example, an authentication mechanism is described in U.S. Pat. No. 5,455,953, which discloses a method and apparatus for use in a data processing system for providing authorization information for a client requesting access to a server resource in a server. This data processing system includes a client mechanism, a server mechanism including a server resource and an authorization mechanism.

Traditionally, authentication and authorization checks have been coded directly into applications. However, with the advent of web-based application architecture, authentication has been abstracted out of many applications and performed by a centralized authentication system. There are several commercial products available today that offer such functionality. One such authentication system is described in U.S. Pat. No. 6,185,682, which discloses an authentication system that includes at least one station and a host. A user transmits an authenticated instruction on the station to the host. The host checks the authenticated instruction, and if valid proceeds with processing the instruction. This system protects against any third party fraudulently pretending to be another party transmitting a message on behalf of the other party.

For the most part, authorization is still typically performed inside of applications; consequently, performing authorization in this manner makes any change in authorization rules slow and costly. In many industries new security regulations are mandated at a rate that makes it impossible and/or very costly to keep authorization rules up to date. Therefore, there is a need for a system that allows a user to implement and manage authorization access controls in a relatively simple and convenient manner external to applications.

BRIEF SUMMARY OF THE INVENTION

The present invention provides a computer network system that authorizes access to an application by performing authorization of requests based on audit and authorization rules contained in a data store. The process of authorizing the requests occurs external to the secured application. This authorization process is dynamically performed based on rules that employ combinatory and comparison logic of user attributes, resource attributes, and action attributes.

Web-based application architecture separates the presentation logic, application logic, and data into three logic tiers. The presentation logic resides on a web server. The data tier resides on a data server. The application logic occurs on an application server. In some instances, the application server may reside on the same physical system as either the web server or the data server. Users of web based applications use a web browser to initiate an action on the web server. The web server passes the action request to the application server. The application then performs actions on resources residing on the data server based on the requested actions.

The components of the system includes: an authorization engine, an entry point, a rule store, and a management console. The entry point component includes a request interceptor program and an application programming interface (API). Components of the entry point reside on the application server. The interceptor program allows application action requests to be captured and authorized before they reach the application logic server components that perform actions on the resources. Use of the interceptor program allows authorization access control to be applied to existing or new applications without requiring any modification to the application. The API allows application components on either the web server or the application server to make explicit authorization requests.

The authorization engine is a component that evaluates the action request; retrieves attributes associated with the action, resource, and user; retrieves rules associated with the action and the resource; and then determines whether the action is authorized. The authorization engine is a neutral user authentication mechanism; it can be used in conjunction with any user authentication mechanism on the web server provided that the authentication mechanism is trusted and can pass verifiable user identification information. The authorization engine provides components that allow authorization activities to be audited. Additionally, the authorization engine uses caching mechanisms to improve authorization response time by caching attributes and rules.

The rules store is a repository for authorization rules that the authorization engine uses to evaluate requests. The rules contained in the rules store are keyed off an action and the resource the action is being performed on. The rules are comprised of operations that define how to combine, compare, and evaluate attributes of users, resources, and actions in order to determine if an instance of a request is authorized. The rule store resides on the data server.

The management console is a central web based application that provides an interface for administering authorization rules, administering audit rules, and for configuring the authorization system.

In one aspect of this invention, there is a system for authorizing access to an application on a protected computer network. The system comprises a web server, an application server and a data server. The web server is configured to receive a request and transmit it to the application server. The application server is connected to the web server. A rules store in an external data store is connected to the application server. The application server is configured to: receive the request from the web server; to extract attributes of the request; retrieve at least one rule from the rules store; compare the extracted attributes of the request with the at least one retrieved rule; and authorize the request if the extracted attributes of the request meet the at least one rule.

BRIEF DESCRIPTION OF SEVERAL VIEWS OF THE DRAWINGS

The features and advantages of the present invention will become more apparent as the following description is read in conjunction with the accompanying drawings.

DETAILED DESCRIPTION OF THE PRESENTLY PREFERRED EMBODIMENT

Figure 1:
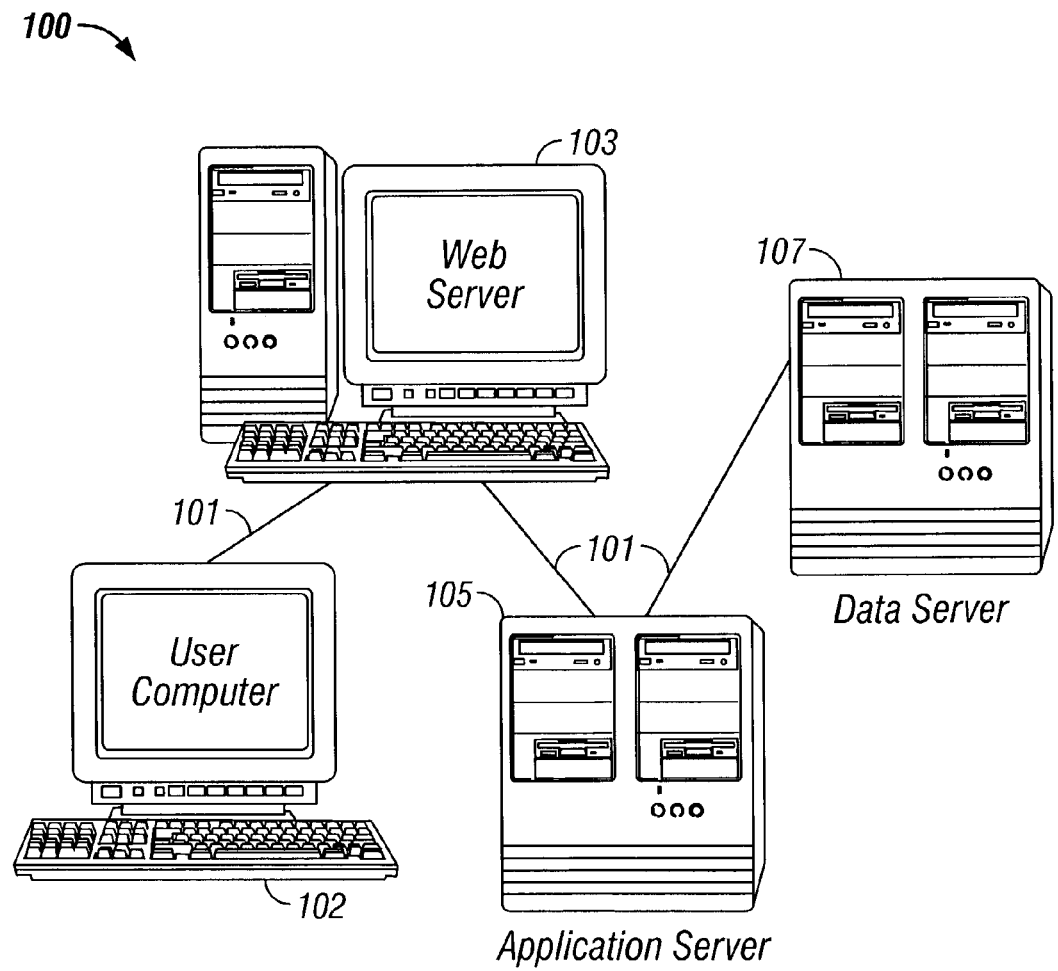
FIG. 1 illustrates a diagram of a computer network system in accordance with the invention.

The presently preferred embodiment of the invention is described herein with reference to the drawings, wherein like components are identified with the same reference numerals. These descriptions are intended to be exemplary in nature and are not intended to limit the scope of the invention.

FIG. 1 illustrates a diagram of a computer network which includes an embodiment of the present invention. An authorization system 100 comprises: at least one network 101, at least one web server 103, at least one application server 105 and at least one data server 107. The authorization system 100 may be referred to as computer network system 100. A user computer 102 may be connected to the computer network system 100 via network 101. User computer 102 may be referred to as computer 102.

Computer 102 includes a memory, a processor, and firmware that perform functions such as the rerouting of incoming data to a printer or video screen. In a preferred embodiment, computer 102 may be a conventional computer, personal digital assistant (PDA), laptop computer, mobile telephone or any other device that can receive and send information through a communication device. Computer 102 may also include a display device, a keyboard, a mouse, a touch panel, a graphical user interface (GUI), a printer, a scanner and any other device associated with a conventional computer.

In the preferred embodiment, computer 102 may request information from web server 103 through network 101. Web server 103 includes a program that is housed on a conventional computer that awaits and fulfills the requests from computer 102. This web server 103 transmits to the computer a response to the request in a Hypertext Transfer Protocol (HTTP), such as Hypertext Markup Language (HTML) pages or files. Normally, every computer connected to a web site on the Internet must have a web browser program. Web browsers often come as part of a larger package of Internet and Intranet-related programs, which provide Internet client functionality.

Application server 105 is used to facilitate the interaction between diverse operating systems and applications or component across internal and external networked systems. An application is a program that performs useful functions in the processing or manipulation of data. In addition, the term "application" includes database managers, word processors, spreadsheets, and other programs that enable the useful manipulation of data. Application server 105 applications are built to follow standards, such as Extensible Markup Language (XML), HTTP, Java Message Service (JMS), Simple Object Access Protocol (SOAP), and Lightweight Directory Access Protocol (LDAP).

Generally, an application server has one of two architectures: the hub-and-spoke model or the network centric bus model, also called the message-bus model. In the hub-and-spoke model, all applications are connected through a central server. The application server manages all communication, data translation, and process interactions among the connected operating systems and applications. When a new operating system or application is connected, it is automatically integrated with all other systems. The hub-and-spoke model is advantageous for companies with limited information technology resources with only a handful of systems handling a moderate volume of transactions.

In the network-centric bus model, all nodes are linked in a series along a common backbone. A node is a connection point, either a redistribution point or an end point for data transmissions. It is programmed or engineered to recognize and process or forward transmissions to other nodes. The network-centric bus model is suited for large enterprises that have dozens or even hundreds of systems handling heavy transaction volumes.

Preferably, data server 107 may be referred to as a "super-program" that runs under the operating system in a computer. Data server 107 may also be referred to as a mainframe or host computer system. This super program provides services for the system administrator, services for the business application programs and specialized servers that run in the computer.

Originally, many services provided by a data server tended to be available only on mainframe computers while less powerful computers ran specialized applications. As these smaller "server" computers became better adapted for business (and recently Internet) applications, the bundle of services required to manage a company-wide set of applications was renamed "the enterprise data server."

Referring to FIG. 1, data or information from the web server 103 is preferably transferred through network 101 to the computer 102. In addition, data or information is transferred from web server 103 through network 101 to the application server 105. Further, data or information is transferred preferably from application server 105 through network 101 to data server 107. Network 101 represents, for example, the Internet which is an interconnection of networks. In addition, the network may be a local access network, a wireless local network, a wide area network, a metropolitan area network, a virtual area network or any network that is able to facilitate the transfer of data between computers. Further, in traversing the network, the data may be transferred through several intermediate servers and many routing devices, such as bridges and routers.

Figure 2:
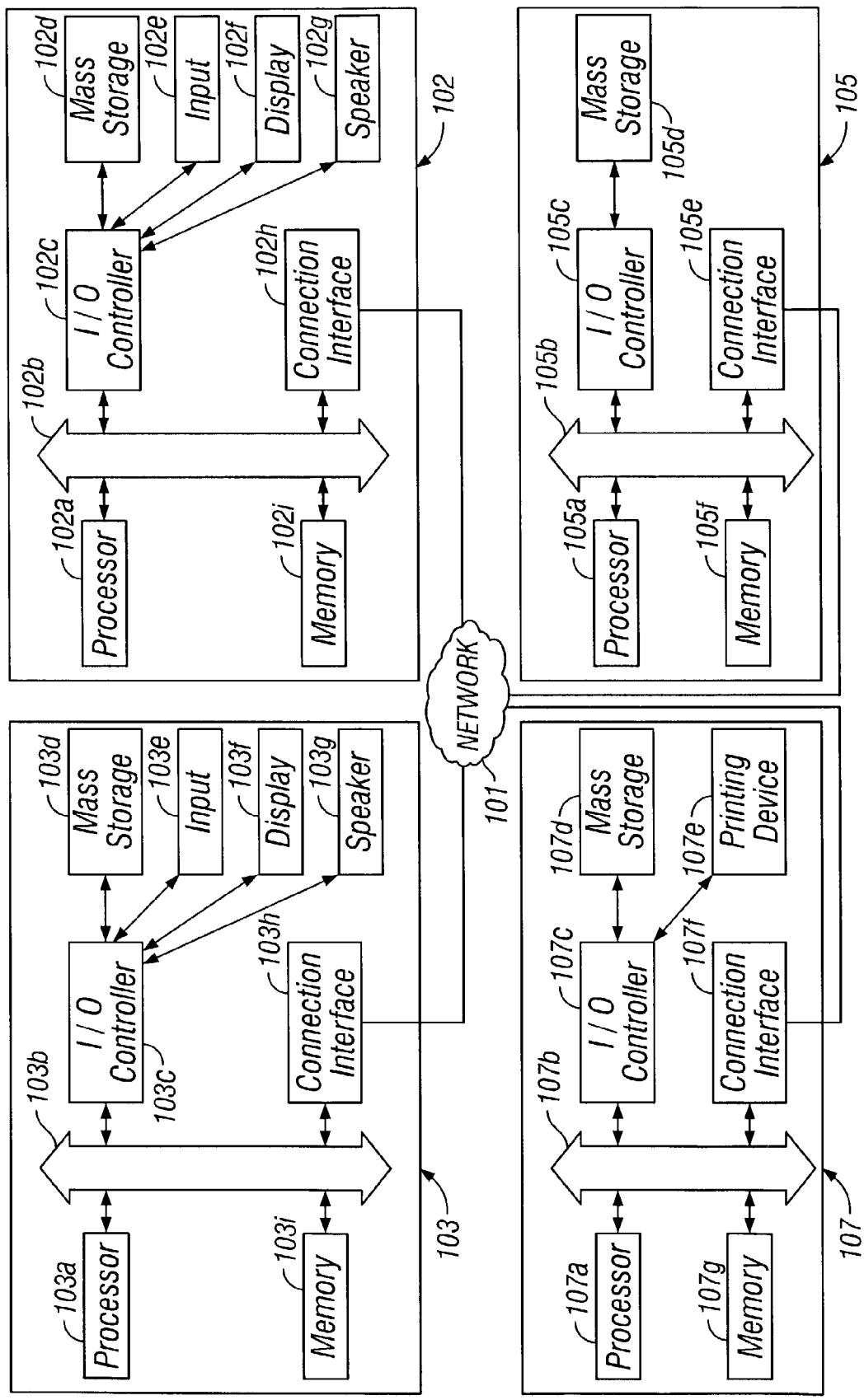
FIG. 2 illustrates components residing on the computer, web server, application server and data server of the computer network system in accordance with the invention.

FIG. 2 illustrates components residing on the computer, web server, application server and the data server of the computer network-system in accordance with the invention. A computer 102 includes conventional components, such as a processor 102a, an Input/Output (I/O) controller 102c, a connection interface 102h, a memory 102i, an input device 102e, a display device 102f and at least one speaker 102g. The term "component" refers to a logical sub-grouping of the software and hardware components of the invention. Typically, the processor 102a, memory 102i, I/O controller 102c, and the connection interface 102h are interconnected through a bus 102b.

Mass storage device 102d, input device 102e, display 102f and the speaker 102g are interconnected to the system through I/O controller 102c. Input device 102e can be a keyboard, mouse, touch screen, touch panel, graphical user interface or any other device or method that can be utilized as an input device. Display 102f is any type of conventional display, for example a Liquid Crystal Display (LCD) or Cathode Ray Tube (CRT). Speaker 102g may be any type of conventional speaker. Computer 102 may also include a printing device (not shown). The structure illustrated in user computer 102 is typical for a personal computer "PC". Connection interface 102h connects computer 102 to network 101, which in turns connects computer 102 to web server 103, in compliance with the necessary data communication protocols.

Web server 103 includes conventional components, such as a processor 103a, an Input/Output (I/O) controller 103c, a connection interface 103h, a memory 103i, an input device 103e, a display 103f and at least one speaker 103g. The processor 103a, memory 103i, I/O controller 103c, and the connection interface 103h are interconnected through a bus 103b.

Mass storage device 103d, input 103e, display 103f and speaker 103g are interconnected to the system through I/O controller 103c. Input device 103e is similar to input device 102e described above. Display 103f is similar to display 102f described above. Speaker 103g may be any type of conventional speaker. Web server 103 may also include a printing device (not shown). The structure illustrated in web server 103 is typical for a personal computer "PC". Connection interface 103h provides an operative connection to connect web server 103 to network 101, which in turn connects web server 103 to computer 102 and application server 105, in compliance with the necessary data communication protocols.

Application server 105 includes conventional components, such as a processor 105a, an I/O controller 105c, a connection interface 105e and a memory 105f. The processor 105a, memory 105f, I/O controller 105c and the connection interface 105e are interconnected through a bus 105b. Mass storage device 105d is interconnected through I/O controller 105c to the bus 105b. The structure illustrated in application server 105 is normal for a personal computer "PC". Application server 105 may also include: an input device similar to input 103e, a speaker similar to 103g and a display similar to display 103f. Application server 105 may also include a printing device (not shown). Connection interface 105e provides an operative connection to connect application server 105 to the network 101, which in turns connects application server 105 to web server 103 and data server 107, in compliance with the necessary data communication protocols.

Data server 107 includes conventional components, such as a processor 107a, an I/O controller 107c, a connection interface 107f, a memory 107g and a printing device 107e. The processor 107a, memory 107g, I/O controller 107c and the connection interface 107f are interconnected through a bus 107b. Mass storage device 107d is interconnected through I/O controller 107c to the bus 107b. The structure illustrated in data server 107 is normal for a personal computer "PC". Data server 107 may also contain an input device, a display device and at least one speaker as in web server 103.

Connection interface 107f provides an operative connection to connect the data server 107 to the network 101, which in turn connects data server 107 to application server 105, in compliance with the necessary data communication protocols. It will be appreciated from the description below, that the present invention may be implemented in components, which are stored as executable instructions on a computer readable medium on the computer 102, web server 103, application server 105 and data server 107. These components may be in mass storage devices 102d, 103d, 105d and 107d, or in memories 102i, 103i, 105f and 107g or in any part of computer 102, web server 103, application server 105, and data server 107. Alternatively the components may be hardware implemented by using electronic circuitry, such as microprocessors, operational amplifiers, logic circuits etc.

The components residing on mass storage 103d, mass storage 105d and mass storage 107d in the computer network system 100 are depicted in FIGS. 3-13b. These figures illustrate examples of the utilization of specific components in the computer network system to perform various authorization functions.

Figure 3:
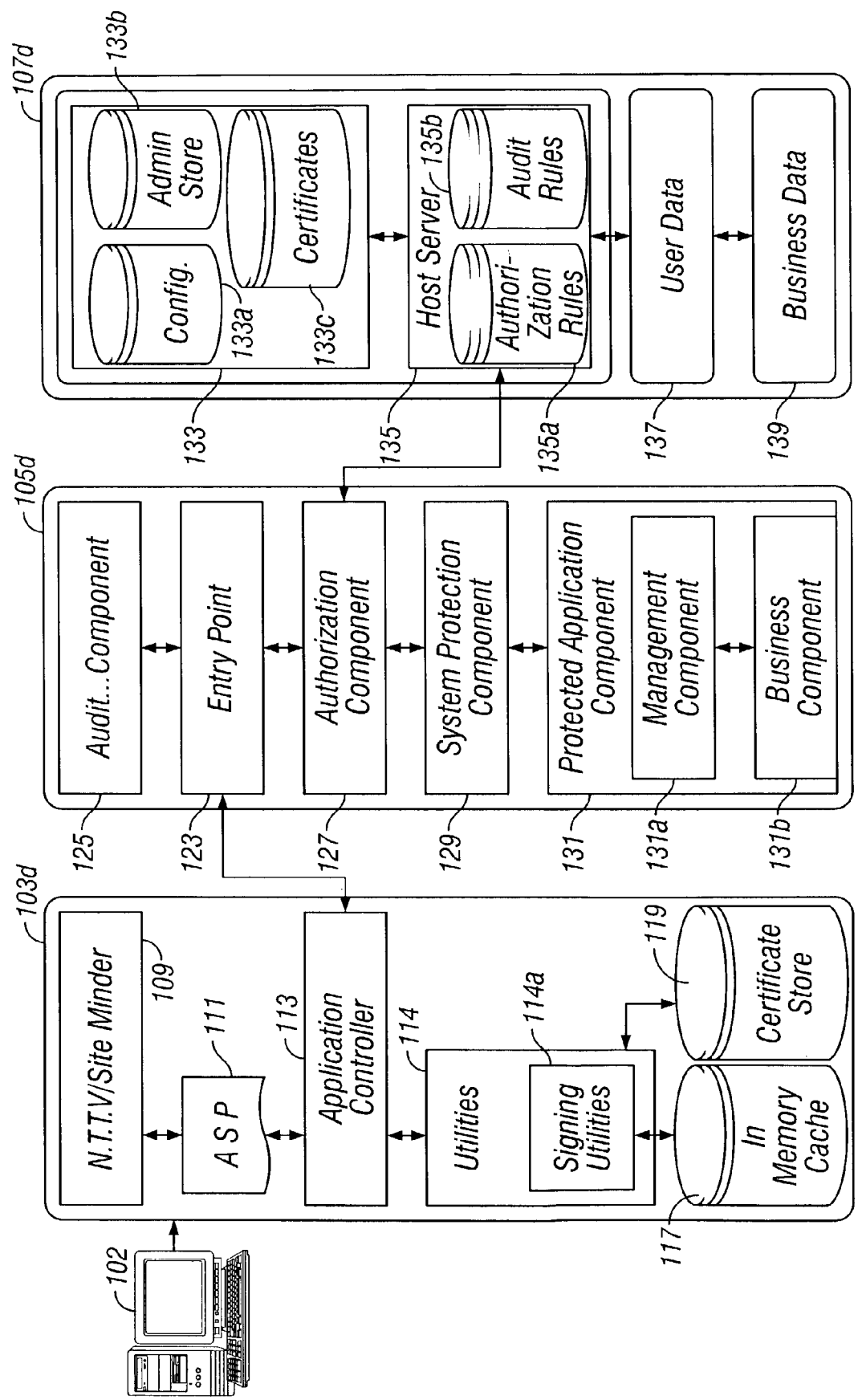
FIG. 3 is a system schematic that illustrates authorization system components residing on the web server, on the application server and on the data server in accordance with the invention.
Figure 4:
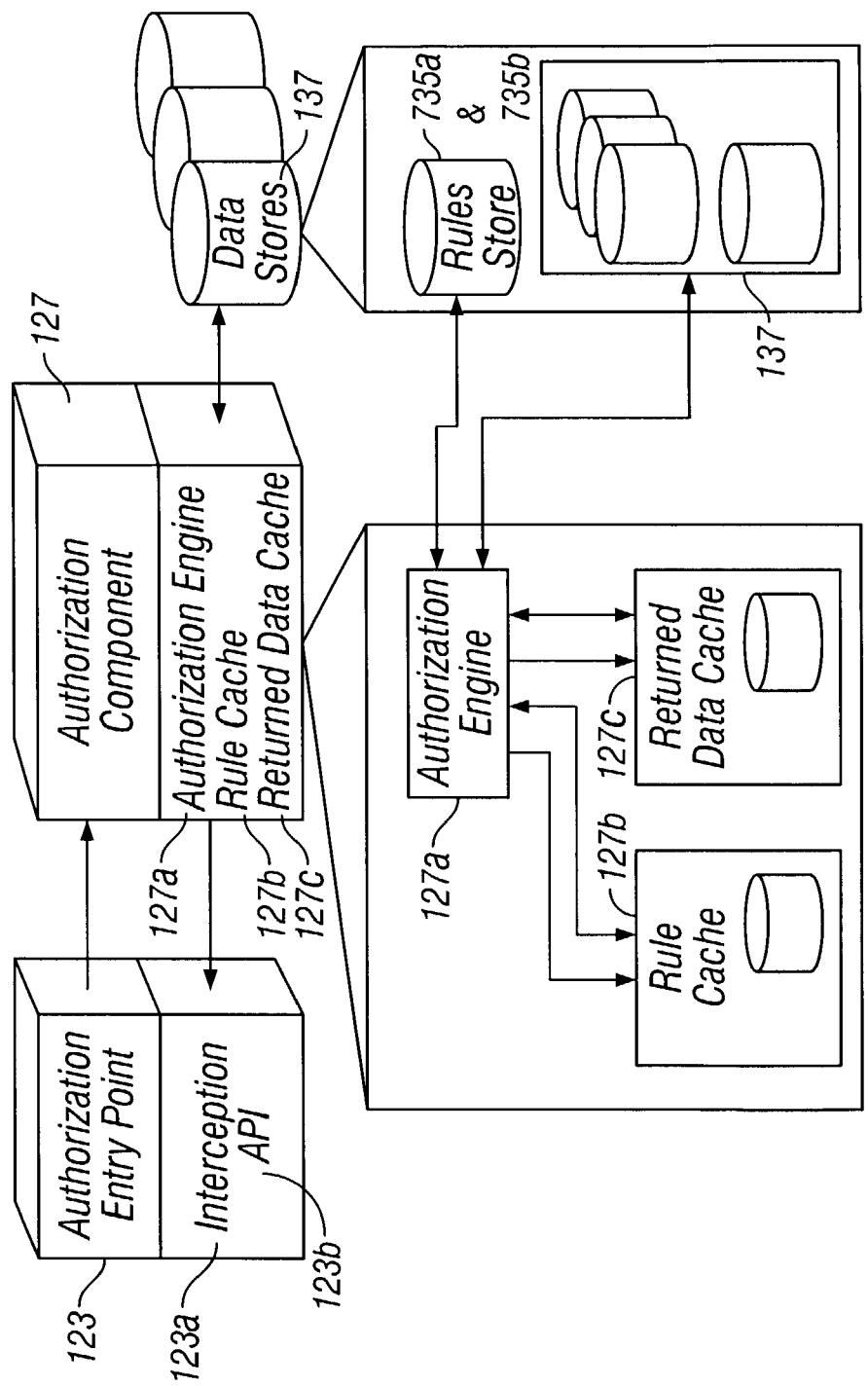
FIG. 4 is a sub-component schematic that depicts the interaction between an entry point component, an authorization component, the user database and other components on the computer network system in accordance with the invention.
Figure 5:
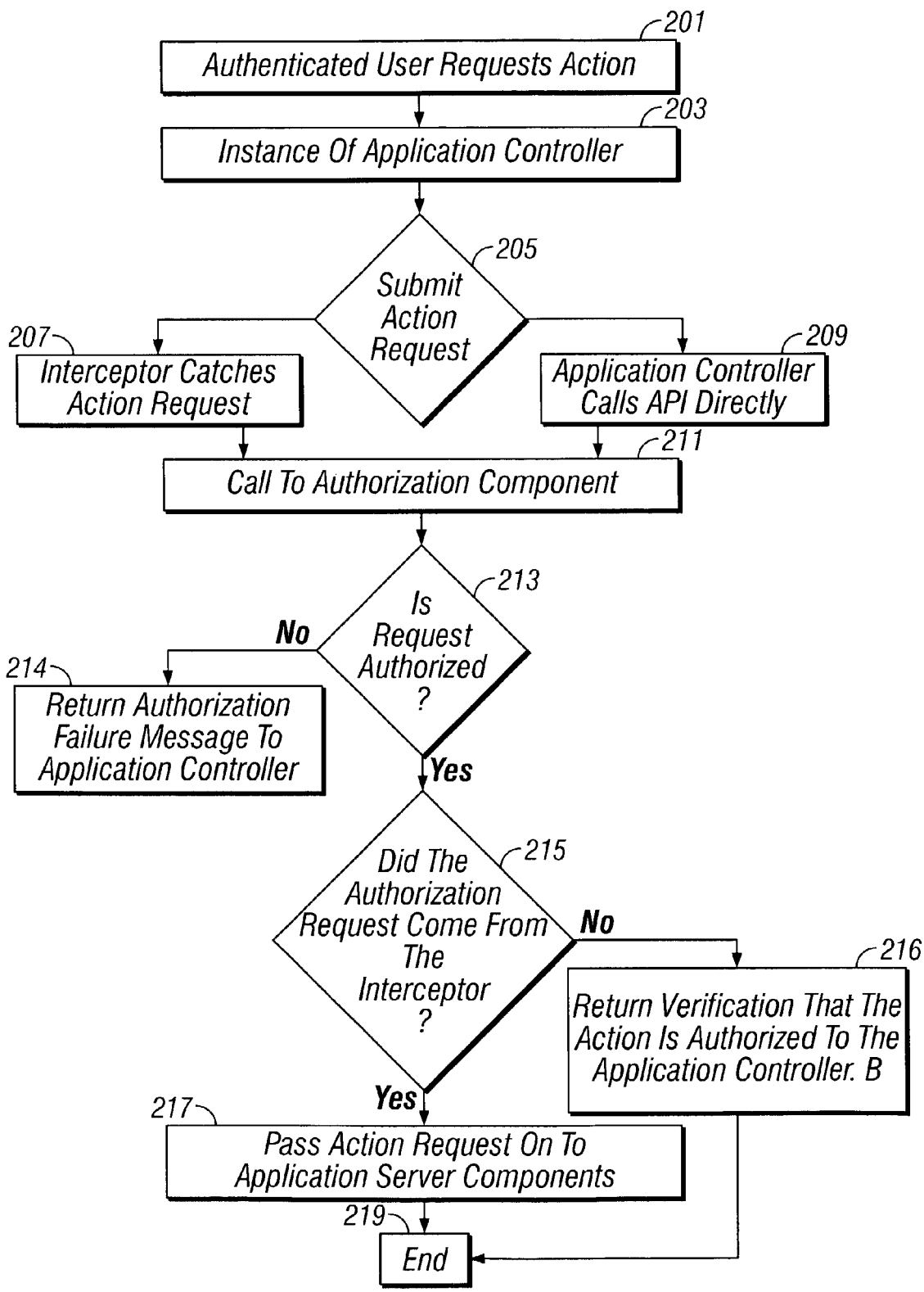
FIG. 5 is a flow chart that depicts the interaction between the entry point component, authorization component and the other components described in FIG. 4 in accordance with the invention.
Figure 6A:
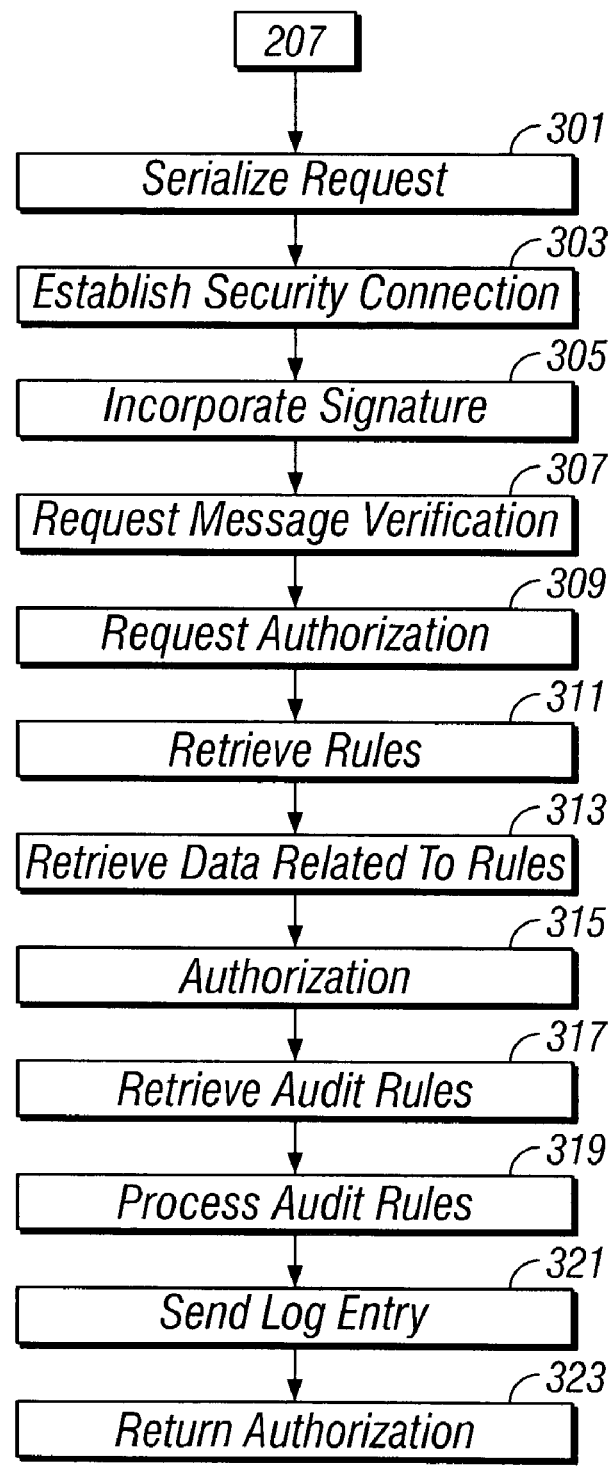
FIG. 6a is a flow chart that depicts the interaction between a signing utility component, a system protection components and the other components on the computer network system in accordance with the invention.
Figure 6B:
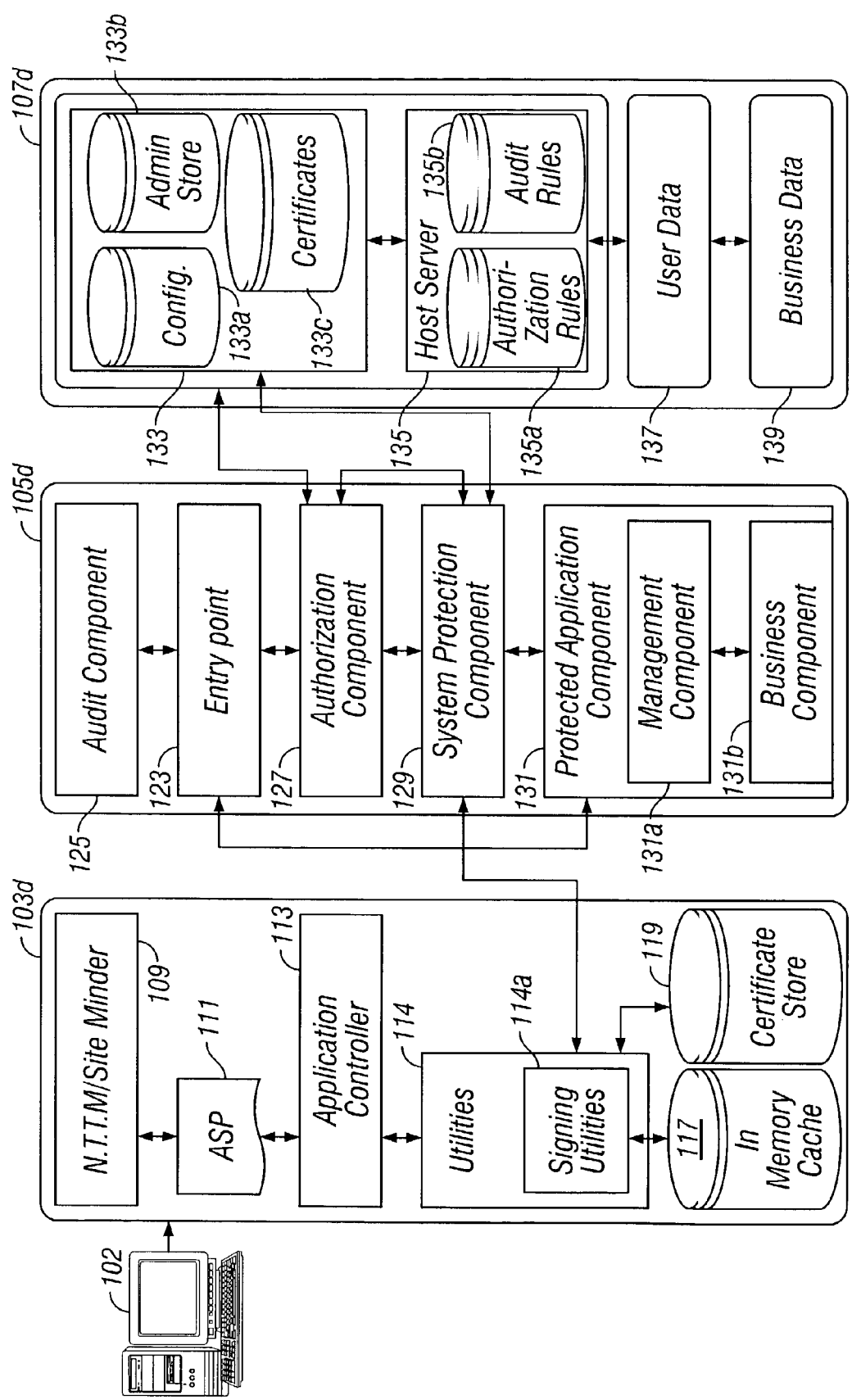
FIG. 6b is a system schematic that illustrates the interaction between the signing utility component, system protection component and the other components described in FIG. 6a in accordance with the invention.
Figure 7:
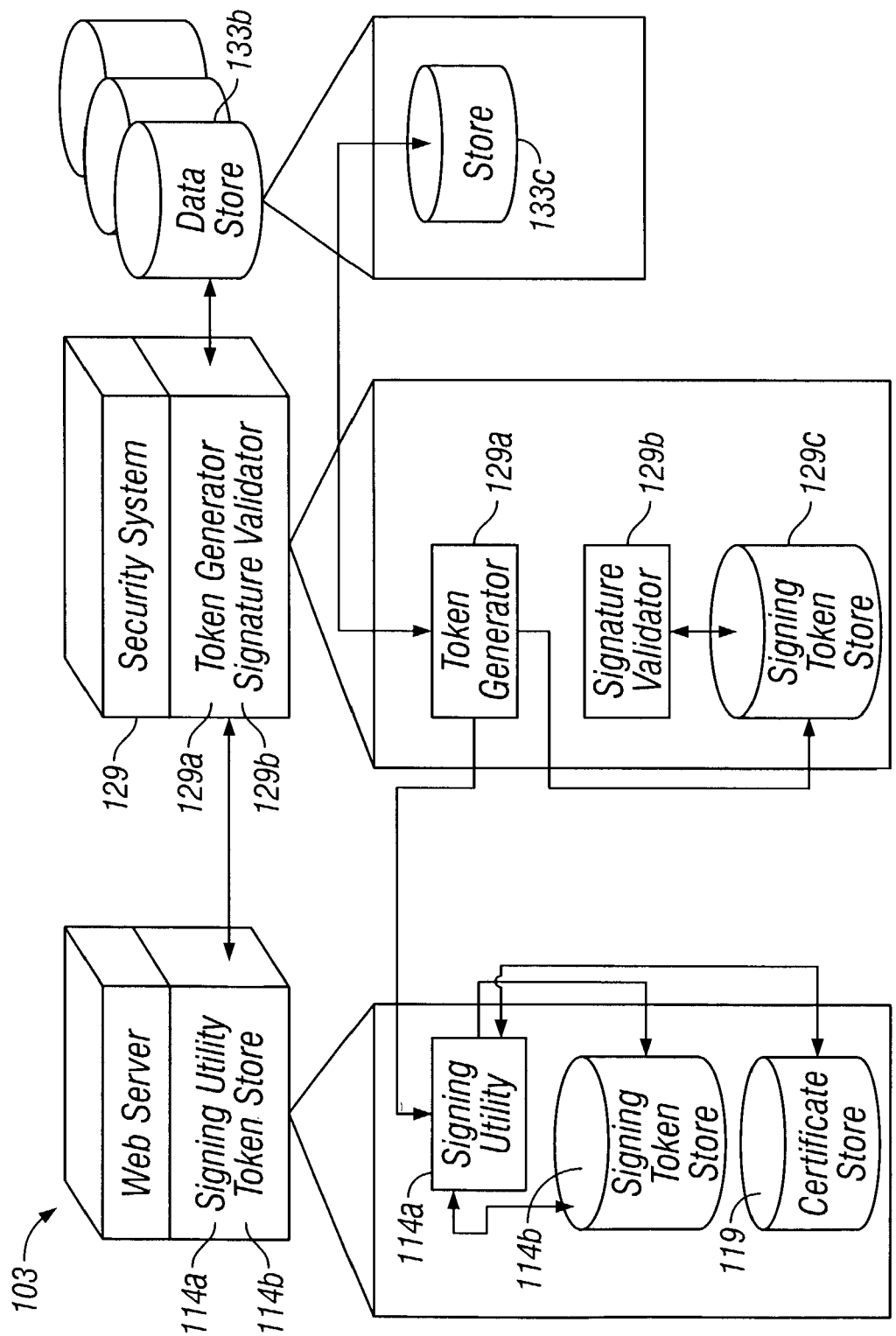
FIG. 7 is a sub-component schematic that depicts the interaction between the signing utility component, the system protection component and all the other components as described in FIG. 6a in accordance with the invention.
Figure 10A:
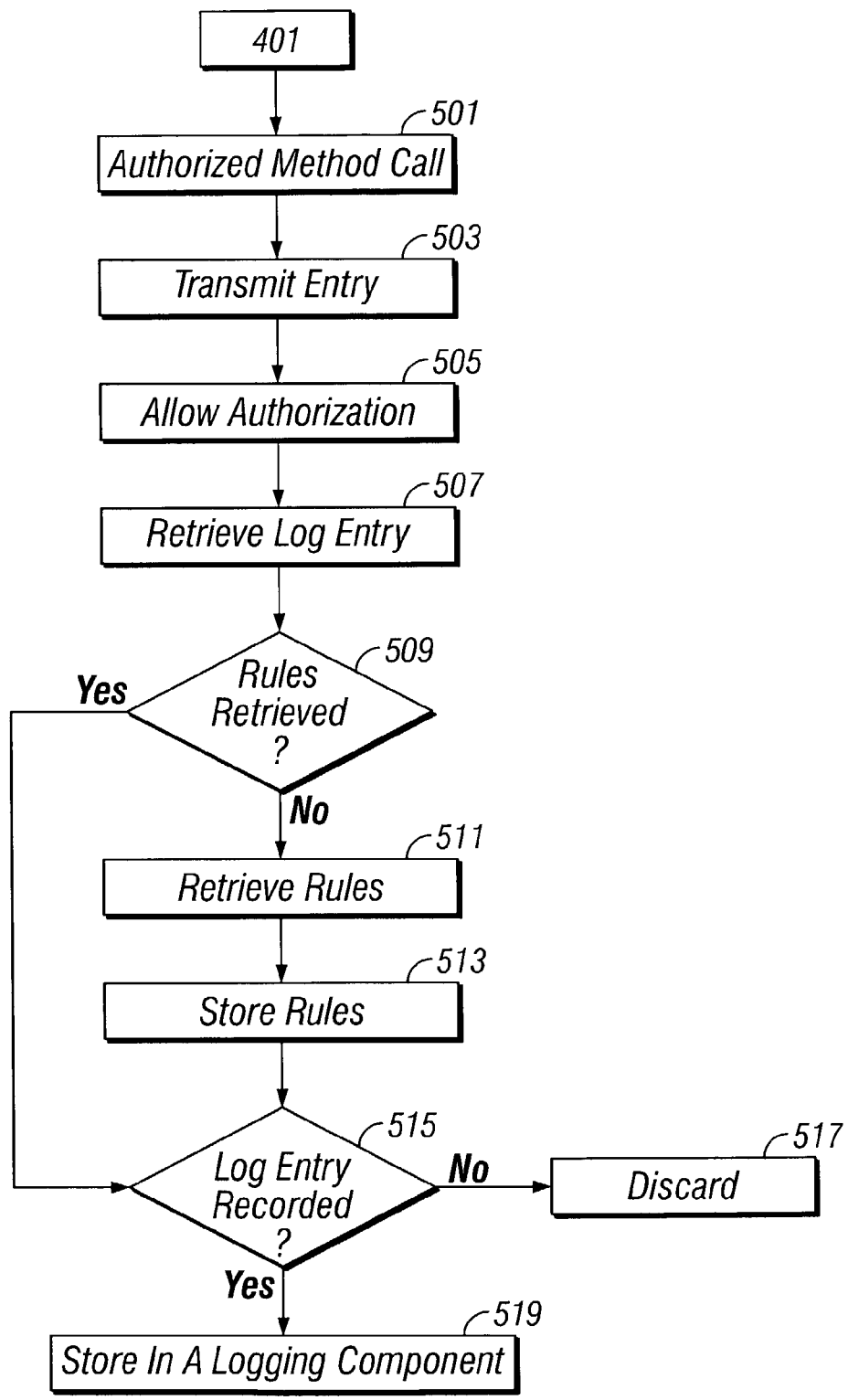
FIG. 10a is a flow chart that depicts the interaction between the audit component, the authorization component and the other components in the computer network system in accordance with the invention.
Figure 10B:
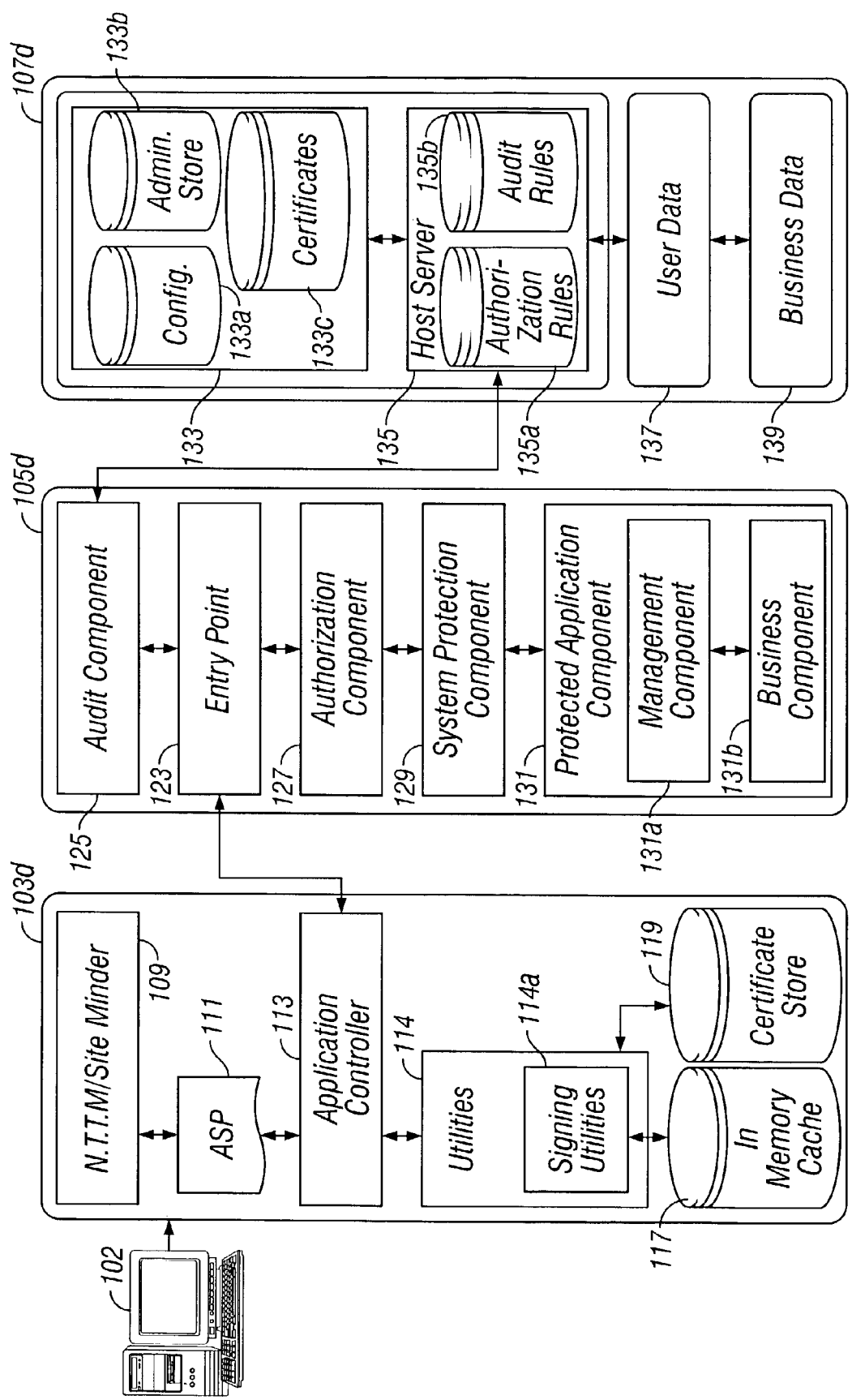
FIG. 10b is a system schematic that illustrates the interaction between the audit component, the authorization components and the other components described in FIG. 10a in accordance with the invention.
Figure 10C:
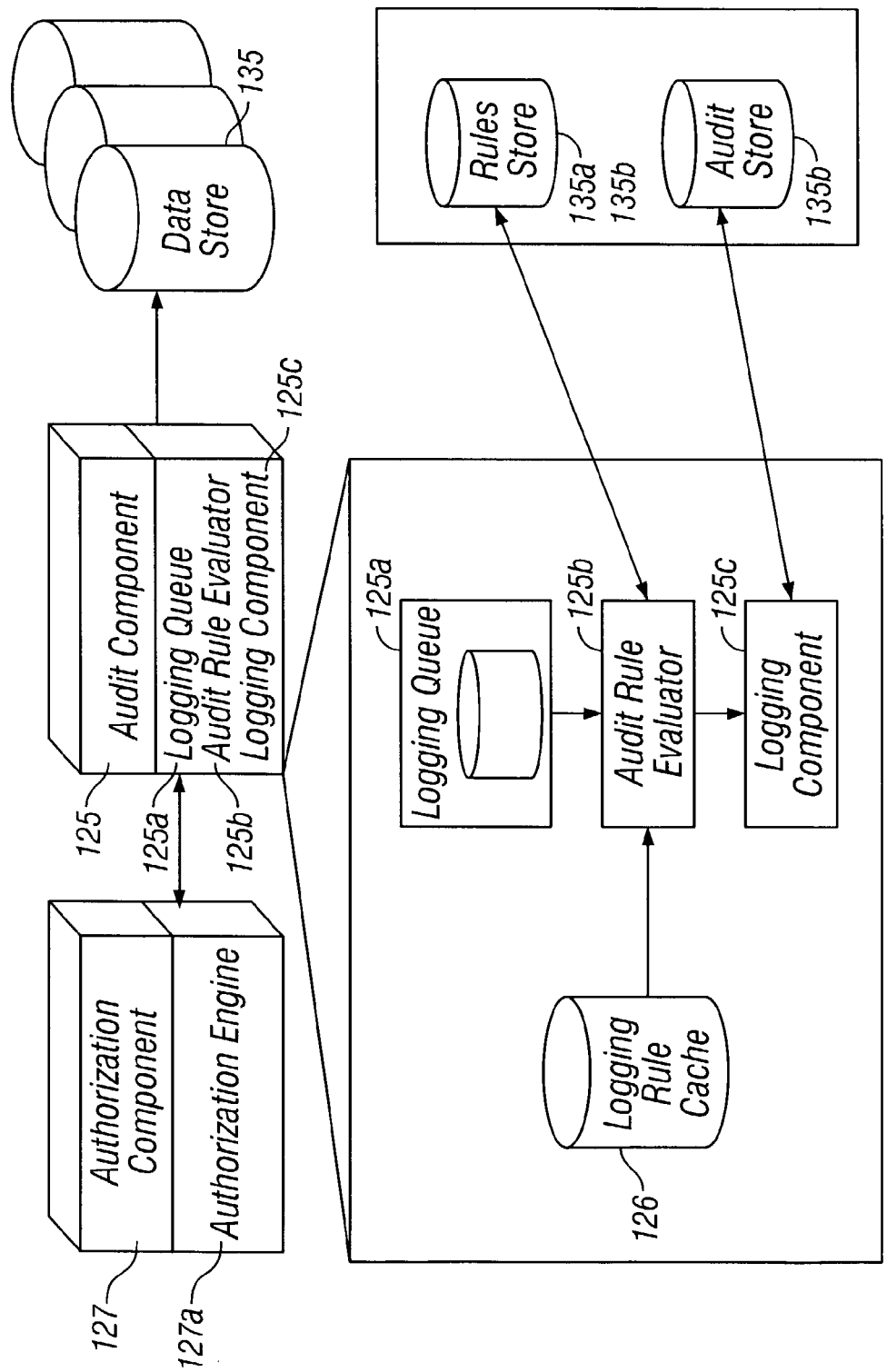
FIG. 10c is a sub-component schematic that depicts the interaction between an audit component, the authorization component and the other components described in FIG. 10a in accordance with the invention.
Figure 11A:
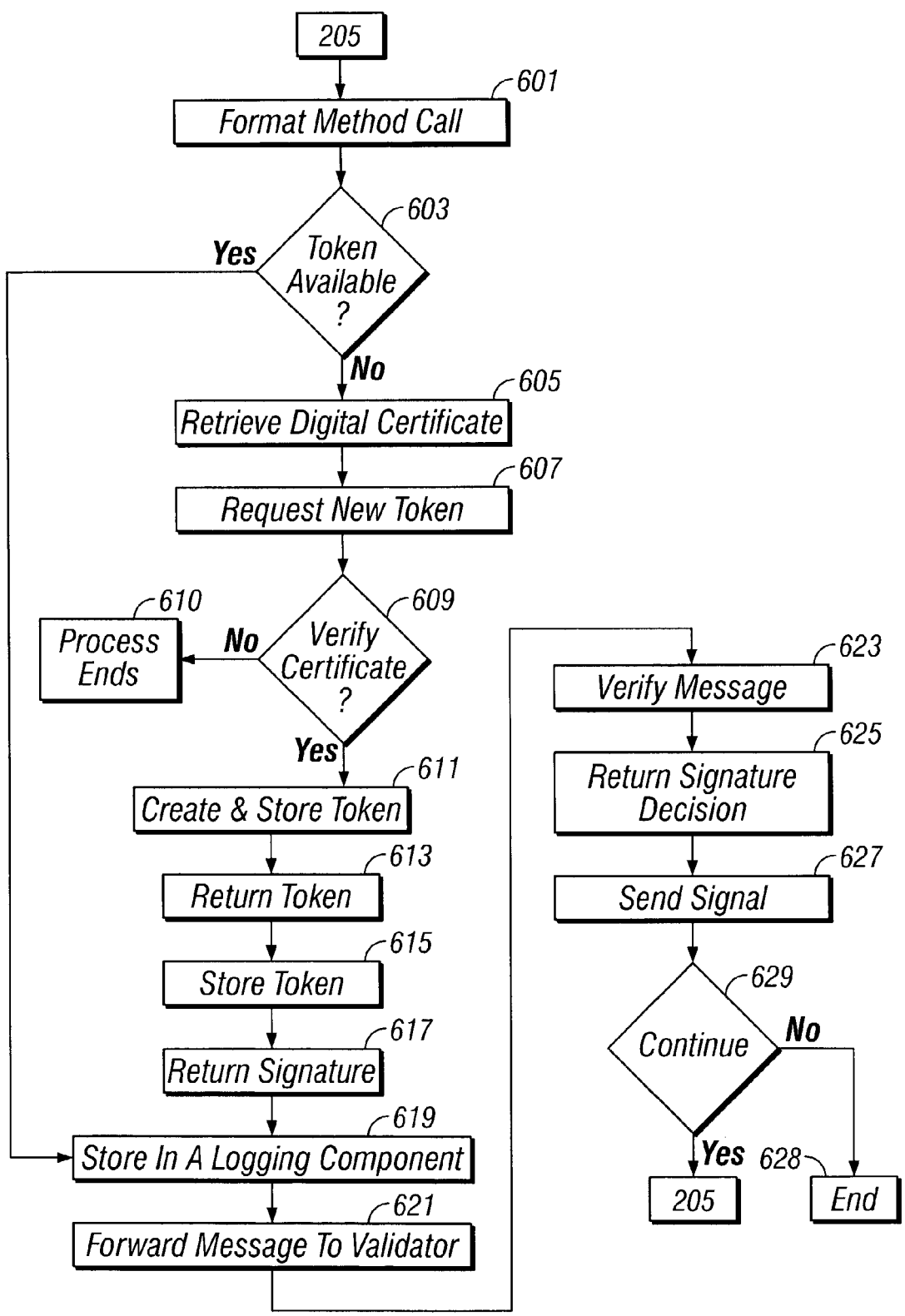
FIG. 11a is a flow chart that depicts the interaction between the components in the computer network system when the components receive a digitally signed request in accordance with the invention.
Figure 11B:
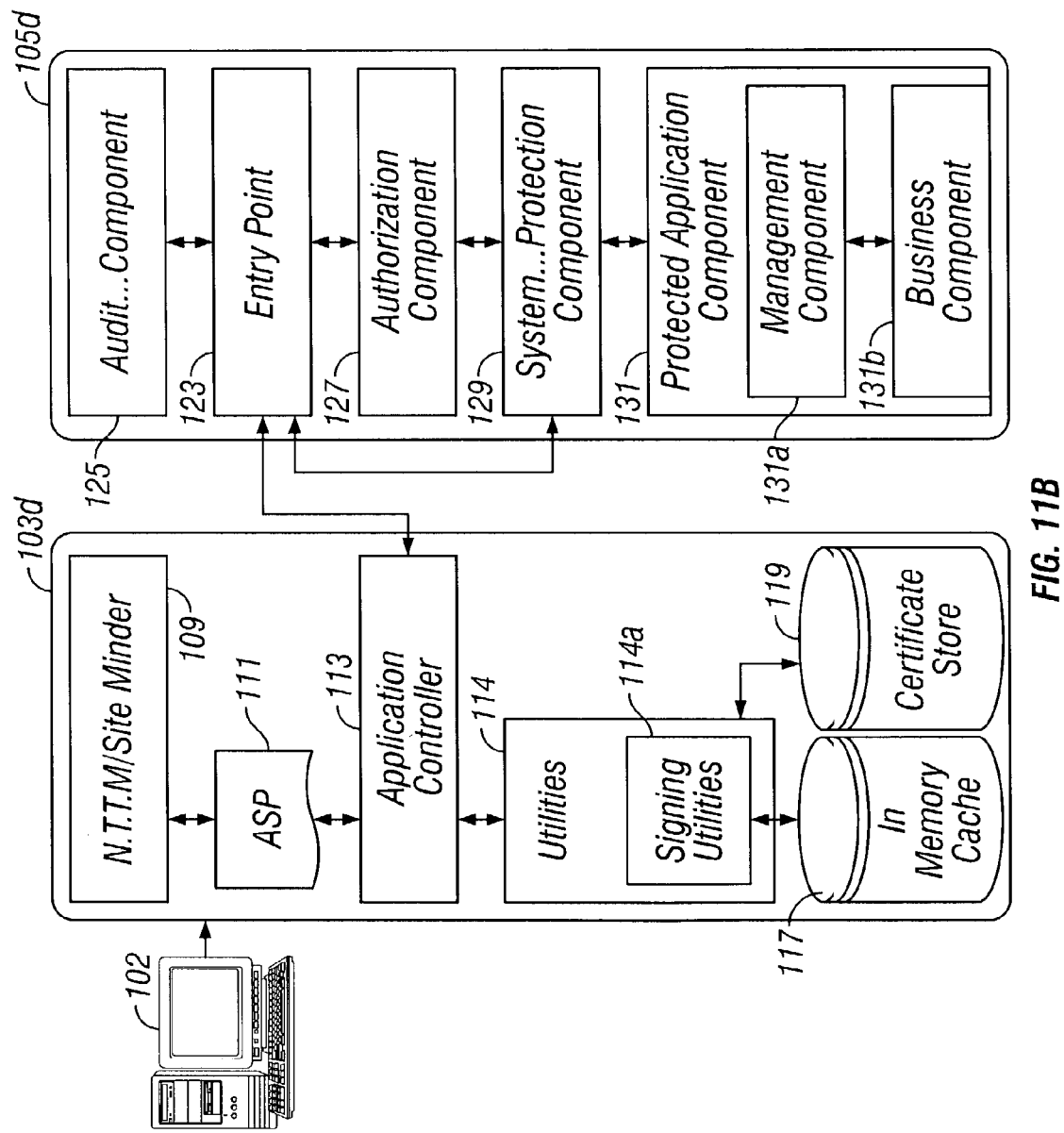
FIG. 11b is a system schematic that illustrates the interaction between the components described in FIG. 11a in accordance with the invention.
Figure 12A:
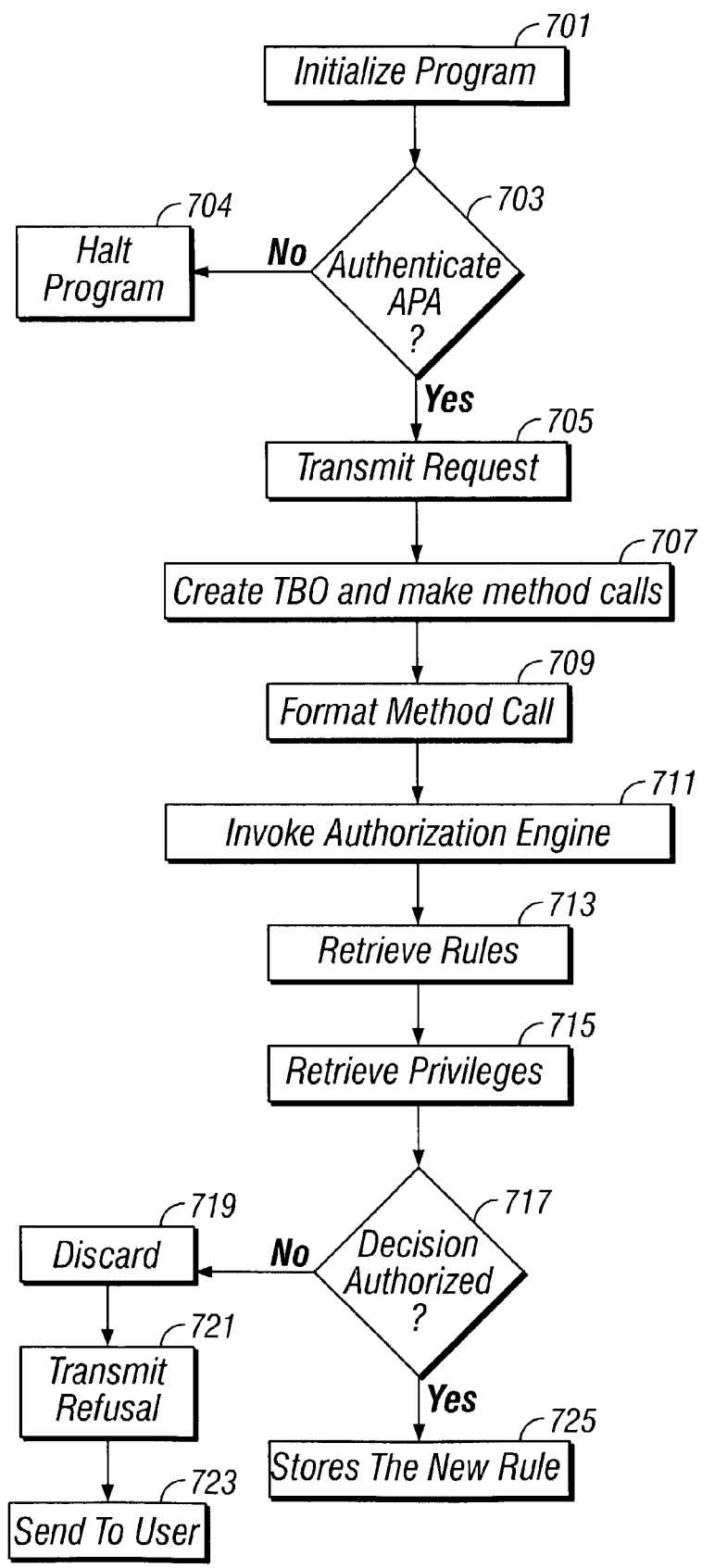
FIG. 12a is a flow chart that depicts the interaction between the components in the computer network system when the components receive a request to modify an authorization rule in accordance with the invention.
Figure 12B:
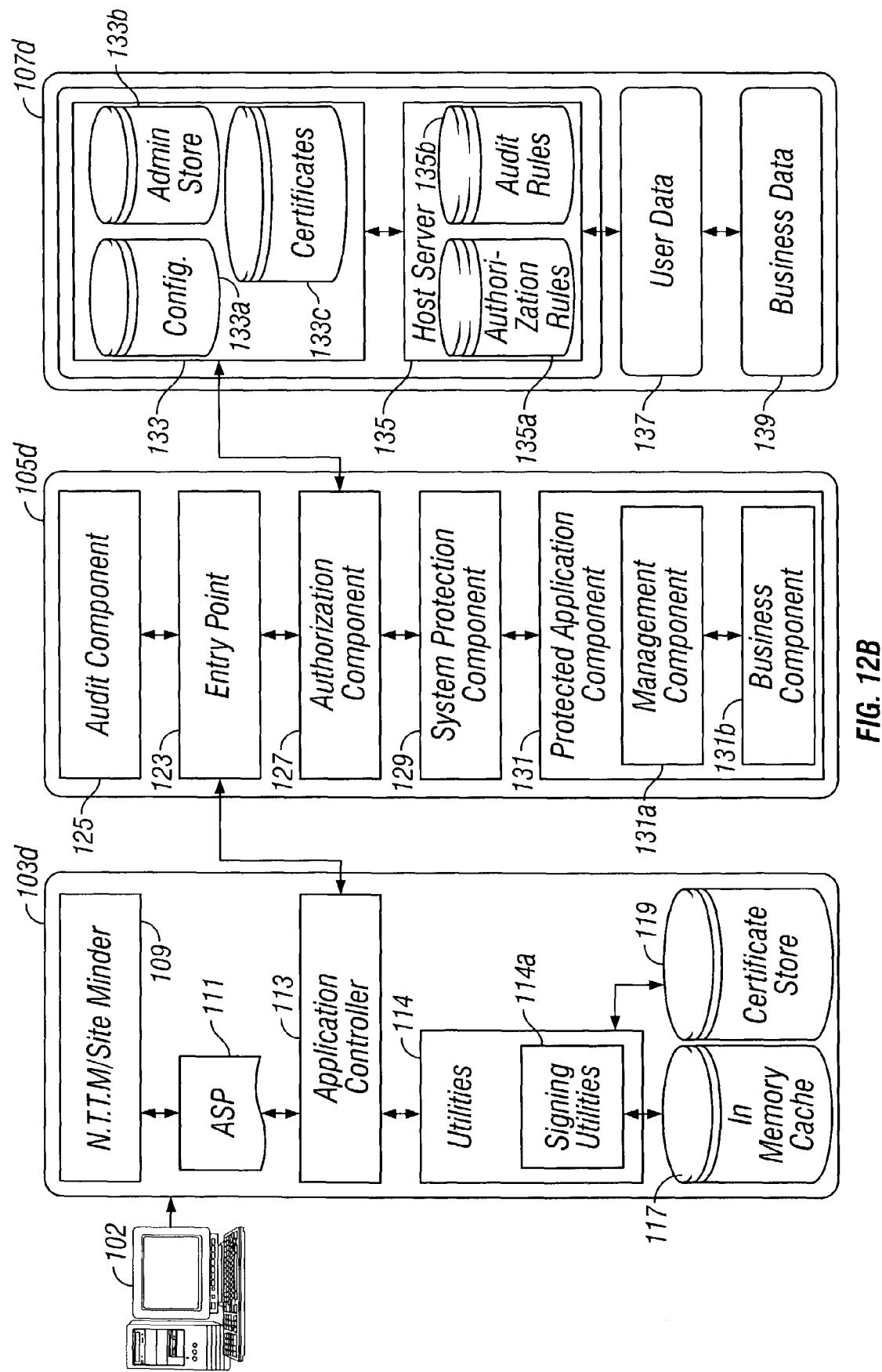
FIG. 12b is a system schematic that illustrates the interaction between the components described in FIG. 12a in accordance with the invention.
Figure 13A:
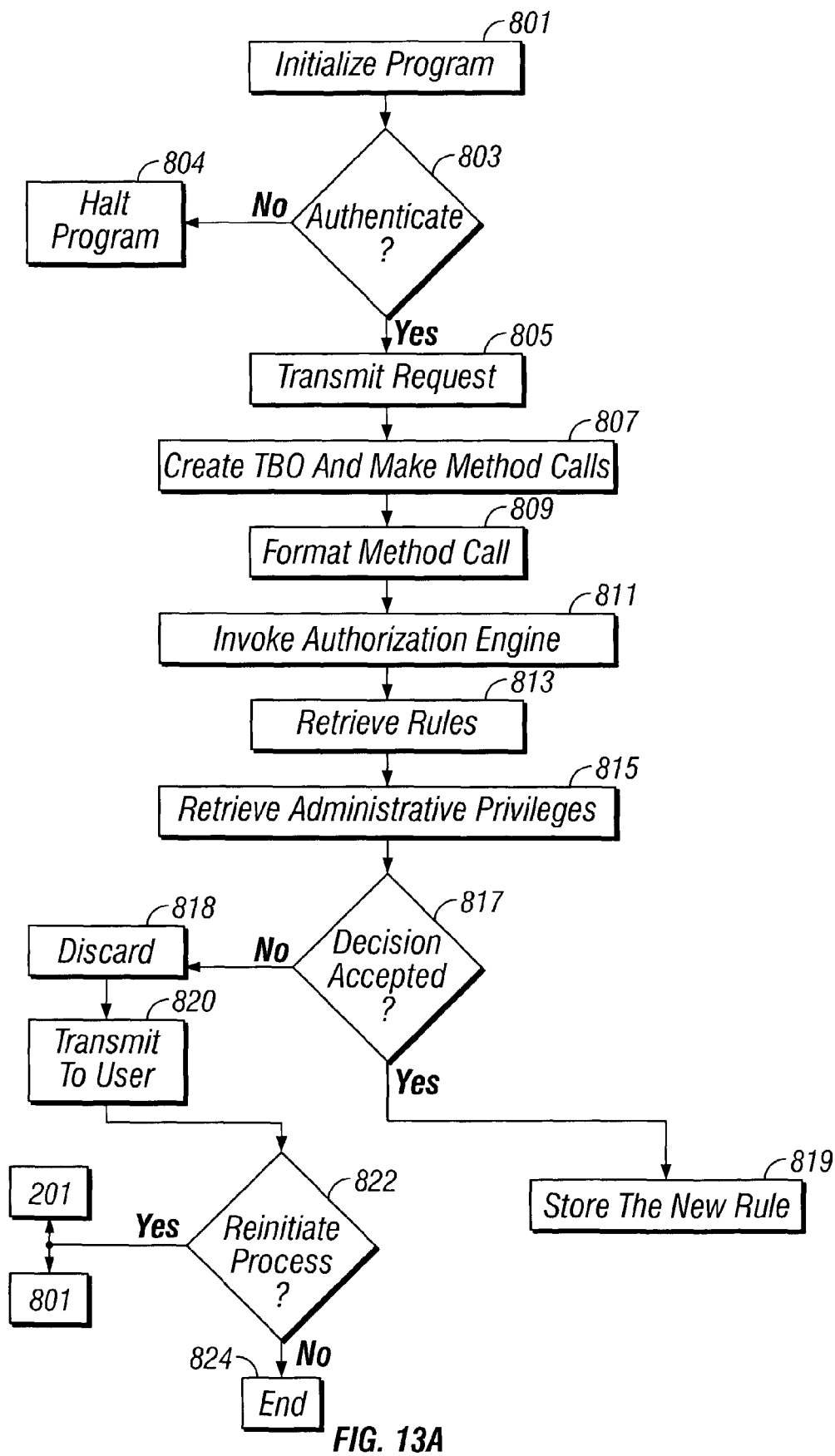
FIG. 13a is a flow chart that depicts the interaction between the components of the computer network system when the components receive a request to manage the entire computer network system in accordance with the invention.
Figure 13B:
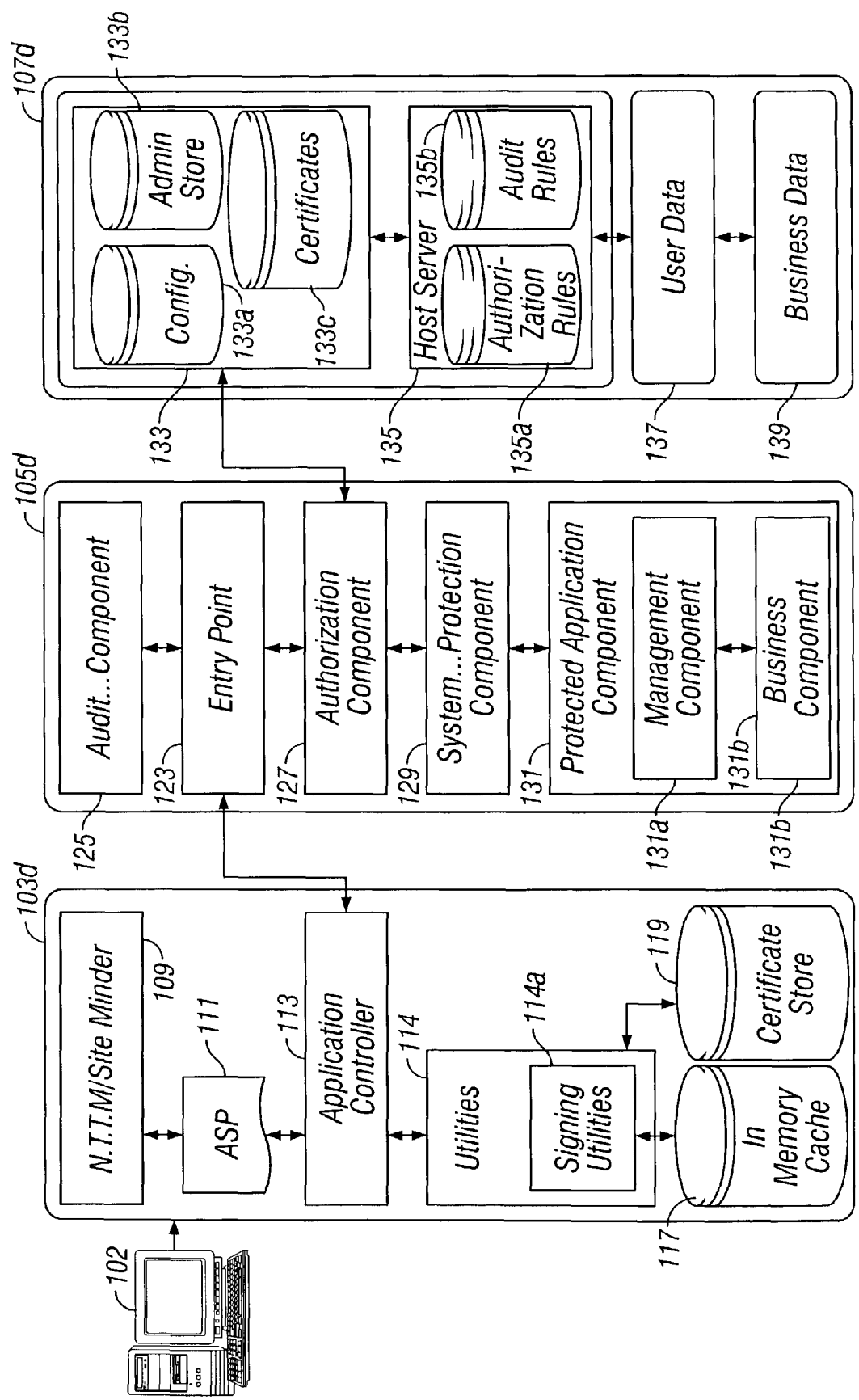
FIG. 13b is a system schematic that illustrates the interaction between the components described in FIG. 13a in accordance with the invention.

FIGS. 3, 4 and 5 illustrate the interaction between the entry point component, the authorization component, the user database and the other components on the computer network system. FIGS. 6a, 6b and 7 illustrate the interaction between a signing utility component, a system protection component and the other components in the computer network system. FIGS. 8a, 8b, 8c and 9 illustrate the interaction between the entry point component, the authorization components, the system protection components and the other components in the computer network system. FIGS. 10a, 10b and 10c illustrate the interaction between the audit component, the authorization component and other components in the computer network system. FIGS. 11a and 11b illustrate the interaction between the components in the computer network system when the components receive a digitally signed request. FIGS. 12a and 12b illustrate the interaction between the components in the computer network system when the components receive a request to modify an authorization rule. FIGS. 13a and 13b illustrate the interaction between the components in the computer network system when the components receive a request to manage the entire computer network system.

FIG. 3 illustrates the authorization system components residing on web server 103, on application server 105 and on data server 107. The authorization components may reside on any portion of web server 103, application server 105, and data server 107. The components in application server 105 may reside on computer 102, web server 103 or data server 107. Mass storage 103d is connected to mass storage 105d in application server 105 by connection interface 103h through network 101 to connection interface 105e.

Mass storage device 103d on web server 103 includes magnetic disk drives, Single in line Memory Module (SIMM) or magneto optical disk drives.

SIMM is a module containing one or several random access memory (RAM) chips on a small circuit board with contact pins that connect a computer motherboard. Alternative storage systems may be used, such as a bubble memory, flash memory, or systems using other storage technologies.

Mass storage device 103d also includes the following components: NTLM/Site Minder 109, Active Server Page (ASP) 111, an application controller 113, utilities 114, a signing utility 114a, an in-memory cache 117 and a certificate store database 119, where all of these components are connected to each other in any combination thereof.

NTLM is an authentication program used for Windows® NT. Any type of authentication program known to those of ordinary skill in the art may be used by this invention in place of NTLM or Siteminder to authenticate the user, such as Kerbos. Kerbos is an authentication program used in Windows® 2000, Windows® XP and Unix Systems. Windows® 2000 and Windows® XP are registered trademarks of Microsoft Corporation which has a corporate headquarters in Redmond, Wash. There are other authentication programs that include biometrics information and/or password identification that may be used in place of NTLM/Site Minder 109 when the user is authenticated at web server 103. Biometrics is the science and technology of measuring and statistically analyzing biological data; it usually refers to technologies for measuring and analyzing human body characteristics such as fingerprints, eye retinas and irises, voice patterns, facial patterns, and hand measurements for authentication and/or security purposes.

Active Server Page (ASP) 111 is an HTML page that includes one or more scripts or small embedded programs processed on a Microsoft Web server before the page is sent to the user. The script on the Web page of the server uses input received as the result of the user's request for the page to access data from a database and then builds or customizes the page before sending it to the requestor. Application controller 113 is a part of the protected application that makes method calls to the application server 105 to perform specific actions based on the request. Application controller 113 either submits the request to the application server 105 or transmits the request to an authorization component 127. Thus, application controller 113 is connected to an entry point component 123 or authorization component 127 of the application server 105 through the network 101. Signing utility 114a in utilities 114 generates at least one message signature for requests using a signing token associated with the application.

Preferably, the in-memory cache 117 is another type of random access memory (RAM) that a computer microprocessor can access more quickly than it can access regular RAM. As the microprocessor processes data, it looks first in the cache memory. If the microprocessor finds the data there (from a previous reading of data), it may avoid the more time-consuming reading of data from larger memory.

Certificate store 119 communicates with signing utility 114*a* in order for signing utility 114*a* to retrieve certificates associated with various users or computer program applications from the certificate store 119. As discussed above, mass storage 103*d* is connected to application server 105*d* by connection interface 103*h* through network 101 to connection interface 105*e* to allow the application controller 113 to communicate with entry point component 123.

Mass storage device 105*d* on application server 105, preferably, includes the same storage system as described in 103*d*. Mass storage device 105*d* includes: an entry point component 123, an audit component 125, an authorization component 127, a system protection component 129 and a protected application component 131, where all of these components are connected to each other in any combination thereof.

Preferably, entry point component 123 receives authorization requests at the application server 105. In the preferred embodiment, entry point 123 includes an interceptor program 123*a* and an application program interface (API) 123*b* as illustrated in FIG. 4. FIG. 4 illustrates a sub-component schematic that depicts the interaction between an entry point component, an authorization component, the user database and other components on the computer network system. In FIG. 4, interceptor program 123*a* intercepts Simple Object Access Protocol (SOAP), Extensible Mark up Language (XML), or Remote Procedure Call (RPC) messages or application requests to a business logic layer and extracts attributes of the request. SOAP messaging provides a way for a program running in one kind of operating system (such as Windows 2000) to communicate with a program in the same or another kind of an operating system (such as Linux) by using the World Wide Web's Hypertext Transfer Protocol (HTTP) and its Extensible Mark-up Language (XML) as the mechanisms for information exchange. RPC is a protocol used by a program in a computer to request service from a program located in another computer in a network without having to understand network details. A procedure call is also sometimes known as a function call or a subroutine call. The attributes of the request include information, such as the identity of the application making the request, the identity of the user making the request, the method to be invoked, and the parameters associated with the request. In one example, the attributes may be a specific amount of money, such as $3,000.00.

With reference to FIG. 4, once the interceptor program 123*a*, has extracted the attribute, it uses API 123*b* to call an authorization engine 127*a* in order to determine whether the request should be authorized. If the call is authorized, interceptor program 123*a* raises an exception and sends the exception back to the calling application or web server 103. API 123*b* provides an interface that allows components, such as a web server application on web server 103 to make calls directly to the application server 105. For example, if an application controller 113 needs to retrieve authorization information for presentation purposes, then it would call API 123*b* to retrieve this information.

In FIG. 3, audit component 125 is used to log all activities related to authorization in the application server 105. In addition, audit component 125 includes: a logging queue 125*a*, an audit rules store 135*b* or logging rule cache 126, an audit rule evaluator 125*b* and a logging component 125*c* as shown in FIG. 10*c*. FIG. 10*c* is a sub-component schematic that depicts an audit component interacting with the authorization components and the other components described in FIG. 10*a* in accordance with the invention.

Referring to FIG. 3, the authorization component 127 evaluates the extracted attributes from the requests transmitted from the web server 103 to determine whether a requested action is authorized. Authorization component 127 retrieves rules from a rules store in authorization rules database 135*a* and audit rules database 135*b*. Authorization rules database 135*a* may be referred to as authorization rules data store 135*a*. Audit rules database 135*b* may also be referred to as audit rules data store 135*b*. For performance reasons, the data stores 135*a* and 135*b* are preferably directories. Likewise, other data and rule storage components referred to herein as databases may also be data stores or directories. Authorization component 127 is connected through the connection interface 105*e* through network 101 to connection interface 107*f* to mass storage device 107*d*, which includes authorization data store 135*a* and audit data store 135*b* in host server database 135. The determination of the request being authorized is based on one or more rules that are associated with the requested action in a rules store. In the preferred embodiment, authorization component 127 receives the extracted attributes from the requests from the API 123*b* and compares the extracted attributes with rules that are in and from a rules store in audit data store 135*b*, authorization data store 135*a*, a local cache or database. The rules cache or rules store is also included in authorization component 127.

The rules in audit data store 135*b* determine what actions to audit. These rules are based on the same ones associated with the authorization rules. In the preferred embodiment, these authorization and audit rules can be updated or changed in any way by any person who has authorized access to the user database 137 or store database 133. The process of updating authorization and audit rules does not affect the operation of the audit data store 135*b* and authorization data store 135*a*.

In addition, these rules in audit data store 135*b* and authorization data store 135*a*, preferably, determines if a user is authorized to perform a request or action based on the rules that relate to date, time, particular role, group, location etc. The request is any type of action requested by a user, such as a request to transfer money, to access information, to print information, to download information, to upload information, etc.

The rules are a combination of operators and elements used to evaluate whether a user or entity is authorized to perform a specific request or action. The operators include: logical operators, context operators and combination operators. Logic operators include: equal, and, or, not, greater than and less than values. Context operators include: contains and matches. Combination operators include: plus, minus, times, divide, union and intersection.

These elements, preferably, include five different types of information: user specific information, action/request specific information, resource/data specific information, transactional specific information and application specific information. First, the user specific information comprises: user identification, user type, user roles, user group membership, current user location and custom user attributes. Next, action/request specific Information includes: action type, action/request time, request source, action priority and custom action attributes. Third, resource/data specific information comprises: resource value, resource type, resource classification and custom resource attributes. Transactional specific information includes: transaction type and previous transaction status. Last, application specific Information includes application availability, application version and application performance. There are other operators and elements known to those of ordinary skill in the art, which may be used in this invention and are not discussed herein.

Preferably, the rules store on authorization data store 135a and audit data store 135b are used to avoid storing all user profile information in one very large directory. Pointers are used in the rules store to point to different data stores on store database 133 that is accessible by authorization component 127. These pointers are called namespaces, and are analogous to the namespaces that are included in an XML schema. Since there are many sources of data, it would be difficult and impractical to store all of the data in a system data store. Preferably, namespaces allow the system to leverage the component that encapsulates the data stores, in a very loosely coupled manner. The namespace information will be stored in a separate table in a host server database 135 on authorization data store 135a and audit data store 135b. This table will contain information, such as the source of the data, the connection string, the programmatic identifier of the component used to access, how to invoke the component, etc. An example of a rule using a namespace is the following: "UserDir:job-Code=12345". This rule dictates that the user must have an attribute on their profile named jobCode, the location, or namespace to find this information.

The utilization of operators and elements may be illustrated by an example of a user initiating an inter-account transfer. In this example, the user requests a transfer of $8,000.00 at 8:00 pm from one account to another. There are several attributes in this request, such as the time, the amount of money, and user identification information. When the aforementioned attributes of the request are transmitted to the authorization component 127, the authorization component 127 determines based on the rules in the rules store in audit data store 135b and authorization data store 135a if the request is authorized. Authorization component 127 uses audit rules database 135b and authorization data store 135a to compare the operator and elements with the attributes of the request to determine if the request is authorized. If the request is authorized, then authorization component 127 executes or performs the request.

Referring to FIG. 4, first, authorization component 127 preferably retrieves and uses one or more rules or elements in audit data store 135b and authorization data store 135a to compare the user identification information attribute in the request with the element of user specific information. If the user identification information is equivalent to or meets the element of user specific information, then this attribute of the request is authorized. Alternatively, if the user identification information is not equivalent to or does not meet the user specific information, then this attribute of the request is not authorized.

Next, authorization component 127 uses one or more rules or elements in audit data store 135b and authorization data store 135a to compare the time attribute of 8:00 pm with the element of action/request time. If the 8:00 pm time attribute is equal to or meets the action/request time, then this attribute of the request is authorized. On the other hand, if this time attribute is not equal to or does not meet the action/request time, then this attribute of the request is not authorized.

Authorization component 127, preferably, combines the authorized user specific information and action/request time attributes to compare them with the operators in the audit data store 135b and authorization data store 135a. The operator AND is used for various combinations of elements, such as the combination of user/specific information and action/request time attributes. These attributes of the request are compared with the operator in audit data store 135b and authorization data store 135a. If there is a match between the attributes and the operator or the attributes meets the operator, then these attributes combined are authorized. Alternatively, if there is not a match between the attributes and the operator or the attributes and the operator do not meet, then these attributes combined are not authorized.

Next, authorization component 127, preferably, uses one or more rules or elements in audit data store 135b and authorization data store 135a to compare the amount of money attribute of $8,000.00 with an element of custom resource attributes. If the amount of money attribute is equivalent to or meets the custom resource attributes, then this attribute of the request is authorized. On the other hand, if the amount of money attribute is not equivalent to or does not meet the custom resource, then this attribute is not authorized.

Next, authorization component 127, preferably, combines the authorized user specific information, action/request time and custom resource attributes to compare them with the operators in the audit data store 135b and authorization data store 135a. The operator AND is used for various combinations of elements, such as the combination of user/specific information, action/request time and custom resource attributes. Preferably, these three attributes of the request are compared with the operator in audit data store 135b and authorization data store 135a. If there is a match between the three attributes and the operator, then these attributes combined are authorized. Alternatively, if there is not a match between the attributes and the operator, then these attributes combined are not authorized.

Next, authorization component 127, preferably, uses one or more rules or elements in audit data store 135b and authorization data store 135a to compare the transaction type attribute of transferring money from one account to another with an element of transaction type. If the transaction type attribute is equivalent to or meets the transaction type, then this attribute of the request is authorized. On the other hand, if the transaction type attribute in the request is not equivalent to or does not meet the element of transaction type element, then this attribute is not authorized.

Last, authorization component 127, preferably, combines the authorized user specific information, action/request time, custom resource and transaction type attributes to compare them with the operators in the audit data store 135b and authorization data store 135a. The operator AND is used for various combinations of elements, such as the combination of user/specific information, action/request time, custom resource and transaction type attributes. Preferably, these four attributes of the request are compared with the operator in audit data store 135b and authorization data store 135a. If there is a match between the attributes and the operator, then these attributes combined are authorized. Otherwise, if there is not a match between the attributes and the operator, then these attributes combined are not authorized.

Referring to FIG. 3, system protection component 129 preferably secures system 100 by preventing unauthorized users from using it or having access to it. This protection component 129 protects system 100 from many types of attacks, such as man-in-the-middle attacks or from being spoofed by rouge or improperly configured requests. Another way of protecting the system is by requiring all users to become authenticated by using a digital certificate.

The digital certificate is an electronic "credit card" that establishes credentials of a user when doing business or other transactions on the Internet. It is issued by a certification authority (CA). This certificate contains a user name, a serial number, expiration dates, a copy of the certificate holder's public key (used for encrypting messages and digital signatures), and the digital signature of the certificate-issuing authority so a recipient can verify that the certificate is real. Some digital certificates conform to a standard, X.509 and they can be kept in registries so that authenticating users can look up other users' public keys. This digital certificate may be used for at least one company for a trusted application.

After being used, the certificate creates a token to sign all messages from the user to the application server 105. This process ensures the integrity of the messages sent to the system, and that unauthorized applications will not be able to use the functionality of the system.

Preferably, application component 131 includes a management component 131*a* and a business component 131*b*. Application component 131 provides two aspects of functionality: application administration and system administration. The application administration provides for the administration of authorization rules and audit rules. The system administration aspect is used for managing the system administrative users, system configuration settings and may be extended to manage additional applications (SiteMinder, Interceptor etc.). Both administration aspects may be delegated to downstream managers, who may administer rights of subordinates within associated applications.

Mass storage device 107*d* of data server 107, preferably, includes an equivalent storage system as described in mass storage device 103*d*. In the preferred embodiment mass storage device 107*d* also includes the components: store database 133, a data server 135, a user database 137 and a business database 139, where all of these components are connected to each other in any combination thereof. Store database 133 comprises: a system configuration database 133*a*, a system administration store 133*b*, and a system certificate database store 133*c*. Data server 135 includes the audit data store 135*b* and the authorization data store 135*a*.

Preferably, user database 137 has an updatable database that is filled with information provided by an operator of the data server 107. Preferably, user database 137 also has stores that refer to any data source which contains user information (Databases, Directory Services, custom files, etc). Preferably, business database 139 includes IBM Mainframe Service (IMS) and other business databases.

FIG. 4 is a sub-component schematic that depicts the interaction between an entry point component, an authorization component, the user database and other components on the computer network system. FIG. 5 is a flow chart that depicts the interaction between the entry point component, authorization component and the other components described in FIG. 4.

Referring to FIG. 5, at 201, a user initializes the process of transmitting at least one request by activating computer 102 to operatively connect through network 101 to web server 103. Alternatively, the request is generated by an internally generated mechanism at computer 102, web server 103, application server 105 or data server 107 or any operator at computer 102, web server 103, application server 105 and data server 107. The user may utilize any input device 102*e* (FIG. 1) to initialize an operative connection between computer 102 and web server 103 by any conventional means or methods known to those of ordinary skill in the art. In this embodiment, for example, the user accesses, through computer 102, a web application on the web server 103 to make at least one request, such as a transfer of $2,000.00 from his savings account to a checking account.

Also at 201, the user is, preferably, authenticated by NTLM/SiteMinder authentication program 109 (FIG. 3) before the request is allowed to reach the web application page associated with web server 103. If the user does not enter a correct password on the web application page, then the connection can be halted and the authentication process ends. The user may choose to end the program or reinitiate the program at 201. If the user is able to enter a correct password on the web application page, then the request is transmitted to web server 103.

At 203, NTLM/SiteMinder authentication program 109 transmits the request to ASP 111 (if the user was authenticated) where ASP 111 creates an instance of an application controller 113 object. The application controller object is a part of the protected application that makes method calls to the application server to perform specific banking actions, for example, the request or an inter-account transfer on the application server 105.

At 205, application controller 113 either submits an action request to the application server 105 for automatic authorization or calls the Authorization API 123*b* directly in entry point component 123 to authorize the request as shown in FIG. 3. At 207, application controller 113 submits the action request to the application server 105, then application controller 113 formats the method call or the request (inter account transfer request) from the application controller into a communication protocol, such as SOAP (or XML/RPC) message and sends it via HTTP to the application server 105. The message is received or caught by interceptor program 123*a* in the authorization entry point component 123 of application server 105. Interceptor program 123*a* extracts attributes of the SOAP message or the request, such as the identity of the application making the request, the identity of the user making the request, the method to be invoked and any other attributes ($2,000.00) associated with the request or message. Interceptor program 123*a* contacts the authorization API 123*b* to determine if the request is authorized and transmits the extracted attributes to API 123*b*.

At 209, application controller 113 calls the Authorization API 123*b* directly to determine if the user is authorized to perform the method call (inter account transfer request). This call can be used, for example, to limit the options displayed in the web application to those actions the user can actually perform.

At 211, API 123*b* transmits the extracted attribute to authorization component 127 to determine, in 213, if the request should be authorized, then executed as described in FIG. 4. Referring to FIG. 4 authorization component 127 is in communication with authorization data store 135*a*. Authorization component 127 includes an authorization engine 127*a*, a rule cache 127*b* and a returned data cache 127*c*. Authorization engine 127*a* is responsible for retrieving and evaluating the rules associated with a method call or the request.

First, authorization component 127 retrieves and uses one or more rules or elements in audit data store 135*b* and authorization data store 135*a* to compare user identification information attribute in the request with the element of user specific information. If the user identification information attribute is equivalent to or meets the user specific information, then this attribute of the request is authorized. Otherwise, if the user identification information is not equivalent to or does not meet the user specific information, then this attribute is not authorized.

Next, authorization component 127 uses one or more rules in audit data store 135*b* and authorization data store 135*a* to compare the amount of money attribute of $2,000.00 with an element of custom resource attributes. If the amount of money attribute is equal to or meets the custom resource attribute, then this amount of money is authorized. Alternatively, if the amount of money is not equal to or does not meet the custom resource, then this amount of money is not authorized.

Authorization component 127 combines the authorized user specific information and custom resources attribute to compare them with the operators in the audit data store 135*b* and authorization data store 135*a*. The operator AND is used for various combinations of elements, such as the combination of user/specific information and custom resource attributes. Preferably, the two attributes of the request are combined and compared with the operator in audit data store 135*b* and authorization data store 135*a*. If there is a match between the attributes and the operator or the attributes meet the operator, then these attributes combined are authorized. On the other hand, if there is not a match between the attributes and the operator or the attributes do not meet the operator, then these attributes combined are not authorized.

Next, authorization component 127 uses one or more rules in audit data store 135*b* and authorization data store 135*a* to compare the transaction type attribute of transferring money from a savings to a checking account to an element of transaction type. If the transaction type is equivalent to or meets the element of transaction type, then this attribute of the request is authorized. Alternatively, if the transaction type attribute in the request does not match with the element of transaction type or the transaction type attribute does not meet with the element of transaction type, then this attribute of the request is not authorized.

Last, authorization component 127 combines the authorized user identification information, custom resources attribute and transaction type attributes to compare them with the operators in the audit data store 135*b* and authorization data store 135*a*. The operator AND is used for various combinations of elements, such as the combination of user/specific information, custom resource and transaction type attributes. Preferably, these three attributes of the request are compared with the operator in audit data store 135*b* and authorization data store 135*a*. If there is a match between the attributes and the operator or the attributes and the operator meet, then these attributes combined are authorized. Otherwise, if there is not a match between the attributes and the operator or the attributes and the operator do not meet, then these attributes combined are not authorized.

Based on the process described above, the authorization engine 127*a*, preferably, returns a yes/no response to the calling application as to whether the request to execute the method is authorized or not. Rule Cache 127*b* is an in-memory store for all rules retrieved from the rules database 135*b*. Returned data cache 127*c* is an in memory store for all namespace data that has been retrieved from an application data in database server 137 and business database 139. Authorization component 127, preferably, provides the API with the results of the determination.

Referring to FIG. 5, at 213, API 123*b* writes the returned results in the results cache. Preferably, these results are based on the rules in authorization data store 135*a* and/or audit data store 135*b*. In addition, the results are in response to the extracted attributes from the request. For instance, the authorization data store 135*a* may allow certain users to transfer $2,000.00 or more money, allow certain users access to a particular account, allow users to transfer money if it is before 5 pm and there are other authorization rules that the extracted information may need to comply with to authorize the request.

The results are transmitted to the interceptor program 123*a* or application controller 113. At 214, if the results do not authorize the request, then the interceptor program 123*a* discards the request and returns a refusal status message or failure message by using any means, such as electronic mail to the application controller 113. Application controller 113 reports the refusal in a SOAP message to the web application of web server 103 and then to the user of computer 102. On the other hand, if the result authorizes the request, then the interceptor program 123*a* based on the authorization data store 135*a* forwards the method call (inter account transfer request) to the appropriate business component 131*b* for execution.

At 215, there is a determination if the authorization request came from the interceptor program 123*a* based on a source field included in the authorization request. At 216, if the authorization request did not come from the interceptor program 123*a*, then the return verification that the action is authorized is sent to the application controller 113. At 217, if the authorization request did come from the interceptor program 123*a* then the action request is transferred or passed to application server business components 131*b* which the authorization interceptor is protecting. At 219, the authorization of the application request ends.

FIGS. 6*a*, 6*b* and 7 illustrate the interaction between a signing utility component, a system protection component and the other components in the computer network system. FIG. 6*a* is a flow chart that depicts the interaction between a signing utility component, a system protection component and the other components on the computer network system. FIG. 6*b* is a system schematic that illustrates the interaction between the signing utility component, system protection component and the other components described in FIG. 6*a*. FIG. 7 is a sub-component schematic that depicts the interaction between the signing utility component, the system protection components and all the other components as described in FIG. 6*a*.

Referring to FIG. 6*a*, this flow chart continues from 207 described in FIG. 5. In this embodiment, the request is initiated by an Application Privilege Administrator (APA) for a banking application who creates a new rule that only the primary account holder can withdraw funds from the savings account. At 301, application controller 113, preferably, formats the method call or request from 207, which is the inter account transfer request or rule creation request, into a SOAP, XML or RPC message. The request may be sent in any Internet language or any language that can be received and interpreted by a computer, web server, application server or data server.

Application controller 113, preferably, calls for a signing utility 114*a* of utilities 114 to digitally sign the SOAP message in order to guarantee the request is being sent from an authenticated application controller and not from a hacked component or an outside source. At 303, if there is no signing token for the application controller 113 in the in-memory cache 117, the signing utility 114*a* uses, preferably, the digital certificate of application controller 113 to establish a secure connection to the system protection component 129 and request a new signing token as shown in FIG. 7. Referring to FIG. 7, the communication between application controller 113, signing utility 114*a* and system protection component 129 is shown in FIG. 6*b*.

Signing utility 114*a* generates at least one message signature for application requests using the signing token associated with that application. In addition, signing utility 114*a* retrieves the signing token if one does not exist, or if the token application has expired. Signing utility 114*a* stores and retrieves the signing token from the signing token store 114*b*. The signing token store 114*b* contains the tokens retrieved by the signing utility 114*a*. The tokens are lightweight (8-32 byte) symmetric keys that have a configurable expiration time.

A certificate store 119 communicates with signing utility 114*a* in order for the signing utility to retrieve certificates associated with various users or applications from the certificate store 119. Preferably, signing utility 114*a* uses a secure connection based on the application certificate to retrieve a signing token from signing token generator 129a in system protection component 129. When the web server 103 or system requests a new token, the token generator 129a: validates the identity of the requesting application, creates the signing token, stores the token and sends the token back to the requestor or web server 103. A signature validator 129b, in system protection component 129 validates the signature, and then compares it to the request to ensure that the source is authentic. Preferably, signature validator 129b uses a message signing token store 129c to verify that all application signatures are valid.

Signing token generator 129a interacts with a system certificate store 133c in store database 133 of data server 107. Preferably, system certificate store 133c contains the certificates assigned to the applications. Preferably, these certificates are used by the signing token generator 129a to validate the authenticity of token requests.

Referring to the flow chart of FIG. 6a, at 305, application controller 113 incorporates the signature or signing token into the SOAP (or XML/RPC) message and sends it via http to the application server 105. Preferably, the message is received at entry point component 123 by an Internet Information Service (IIS). Internet Server Application Program Interface (ISAPI) filter or .NET http module. The .NET module is a module in the Microsoft.NET platform that allows http requests to be intercepted before they reach an application (similar to ISAPI filters).

ISAPI is a set of Windows program calls that allows a user to write a Web server application that will run faster than a common gateway interface (CGI) application. A disadvantage of a CGI application (or "executable file," as it is sometimes called) is that each time it is run, it runs as a separate process with its own address space, resulting in extra instructions that have to be performed, especially if many instances of it are running on behalf of users. By using ISAPI, a dynamic link library (DLL) application file is created that and can run as part of the Hypertext Transport Protocol (HTTP) application's process and address space. The DLL files are loaded into the computer when HTTP is started and remain there as long as they are needed; they don't have to be located and read into storage as frequently as a CGI application.

The ISAPI as the interceptor program 123a, as described above, extracts attributes or information from the SOAP message, such as the identity of the application making the request, the identity of the user making the request, the method to be invoked and the attributes ($2,000.00) associated with the request or message.

At 307, system protection component 129 verifies the digital certificate against a back-end certificate store 133c in database 133 to create a new signing token and return it to the signing utility of utilities 114, as shown in FIG. 6b.

At 309, entry point component 123 requests authorization component 127 to determine the privilege or rights of the user to transfer funds or the APA's privilege to create an authorization rule based on the extracted information.

At 311, authorization component 127, retrieves rules for the requested action from the rules store or rules cache by retrieving authorization rules from authorization data store 135a, as shown in FIG. 6b. Referring to FIG. 6a, at 313, authorization component 127 retrieves attributes of the user from the user database 137 or administrative privileges from the back-end certificate store 133c or administration store 133b needed to evaluate the method rules.

At 315, authorization component 127, compares and evaluates the rules of authorization data store 135a and user database 137 to the attributes of the request to determine whether the user or APA is authorized to perform the requested action shown at FIG. 4. First, authorization component 127 uses one or more rules or elements in audit data store 135b and authorization data store 135a to compare APA identification information attribute in the request with the element of user specific information. If the APA identification information attribute is equivalent to or meets the element of user specific information, then this attribute is authorized. Alternatively, if the APA identification information attribute is not equivalent or does not meet the user specific information, then this attribute of the request is not authorized.

Next, authorization component 127 uses one or more rules or elements in audit data store 135b and authorization data store 135a to compare the rule creation attribute with an element of action/request type. If the rule creation attribute is equal to or meets the action/request type, then this attribute of the request is authorized. On the other hand, if the rule creation attribute is not equal to or does not meet the action/request type, then this attribute of the request is not authorized.

Authorization component 127 combines the authorized user specific information attribute and action/request time attribute to compare them with the operators in the audit data store 135b and authorization data store 135a. The operator AND is used for various combinations of elements, such as the combination of user/specific information attribute and action/request type attribute. Preferably, these two attributes of the request are combined and compared with the operator in audit data store 135b and authorization data store 135a. If there is a match between the two attributes and the operator or the two attributes and the operator meet, then these attributes combined are authorized. Alternatively, if there is no match between the attributes and the operator or the two attributes and the operator do not meet, then these attributes combined are not authorized.

Next, authorization component 127 uses one or more rules or elements in audit data store 135b and authorization data store 135a to compare the specific banking application attribute with an element of transaction type. If the specific banking application attribute is equal to meets the transaction type, then this attribute is authorized. Otherwise, if the specific banking application attribute is not equal to or does not meet the element of transaction type, then this attribute of the request is not authorized.

Last, authorization component 127 combines the authorized user specific information attribute, action/request time attribute and transaction type attribute to compare them with the operators in the audit data store 135b and authorization data store 135a. The operator AND is used for various combinations of elements, such as the combination of user/specific information attribute, action/request type attribute and transaction type attribute. Preferably, these three attributes of the request are compared with the operator in audit data store 135b and authorization data store 135a. If there is a match between the three attributes and the operator or the three attributes and the operator meet, then these attributes combined are authorized. Alternatively, if there is no match between the attributes and the operator or the attributes and the operator do not meet, then these attributes combined are not authorized.

If the user or APA is authorized to perform the action, then the entry point component 123 forwards the action to the proper protected application component 131, such as a business object for the funds-transfer request or management component 131a for the rule creation request as shown in FIG. 6b.

Referring to FIG. 6a, at 317, audit component 125, preferably, retrieves the audit rules for the log entry from the audit rules store in authorization component 127, and audit data store 135b. For example, an audit rule might specify that a request for an inter-account transfer is recorded only when the amount is $200.00 or greater; a similar rule might specify that all rule-creations must be recorded. If the rules determine that the log entry should be recorded, the audit component 125, preferably, stores the log entry to the data store specified by the logging rules. Otherwise, the log entry is simply discarded.

At 319, the protected application component 131, preferably, acts on the request or processes the audit rules in three different ways. First, management component 131a stores the definition of a namespace of the system in a configuration store 133a, or a rule management component can store a new rule in the rules store. Next, an external user/group management component can retrieve or update the attributes of the user in back-end directories and databases by interacting with user data server 137. Last, business component interacts with business data server 139 to retrieve or update back-end application data.

At 321, entry point component 123, authorization component 127, protection component 129 can send a formatted log entry to the audit component 125. For example, the entry point component 123 could log the request for an inter-account transfer or rule-creation and the authorization component 127 could log whether the requested action was authorized or refused.

At 323, the user is notified what occurred in the transaction, such as a returned authorization granted or denied. For example, the user may be informed that the inter-account transfer is successful or failed by a display on the web application of web server 103 that says, "You are not authorized" or "System is not working, call the help desk." The notification is sent by SOAP (XML/RPC) messaging in a HTTP from application server 105 to web server 103 to computer 102. After the user receives the notification at computer 102, then he can continue the process at 201 or end the process at 323.

Figure 8A:
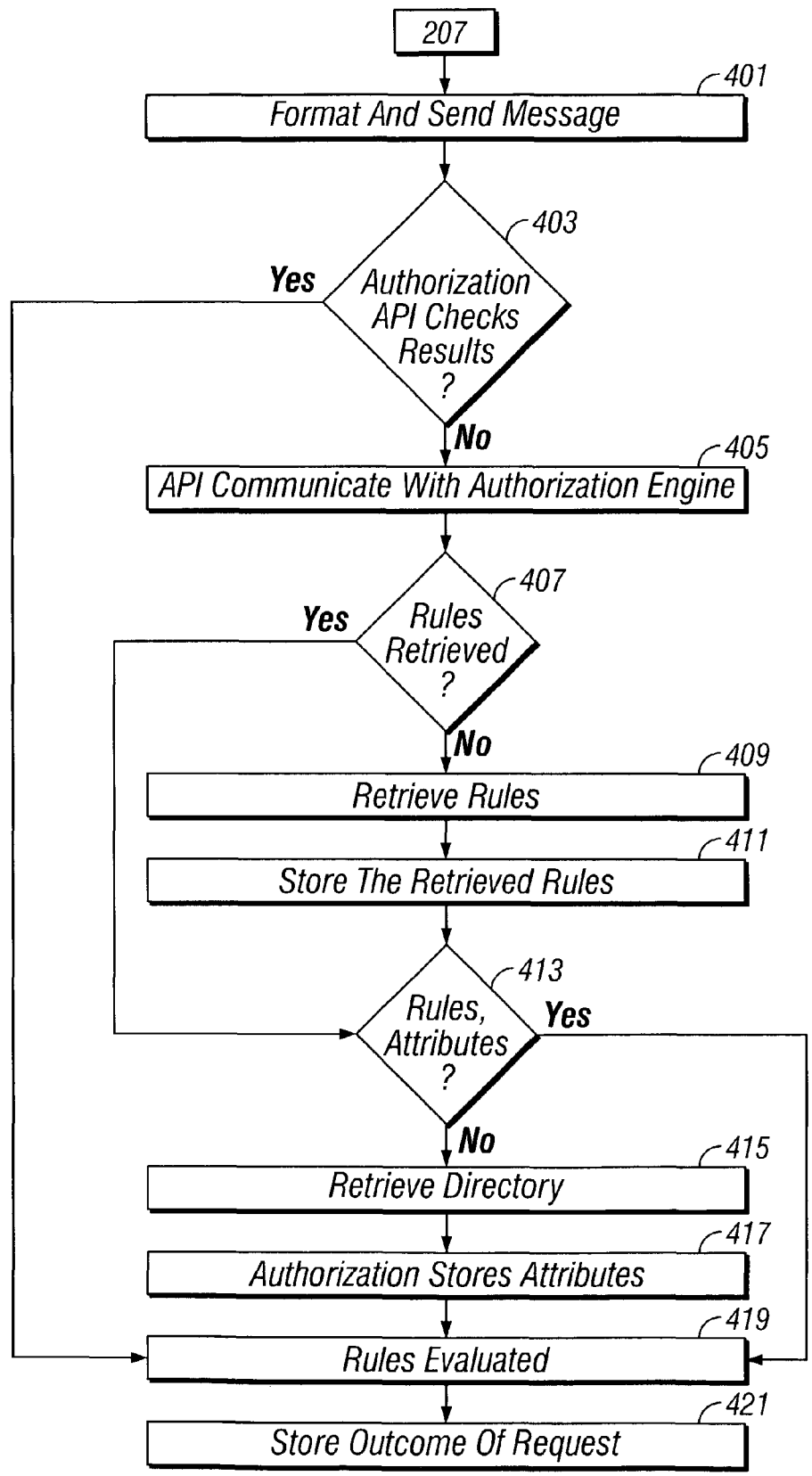
FIGS. 8a and 8b are flow charts that depict the interaction between the entry point component, the authorization component and the system protection component and the other components in the computer network system in accordance with the invention.
Figure 8B:
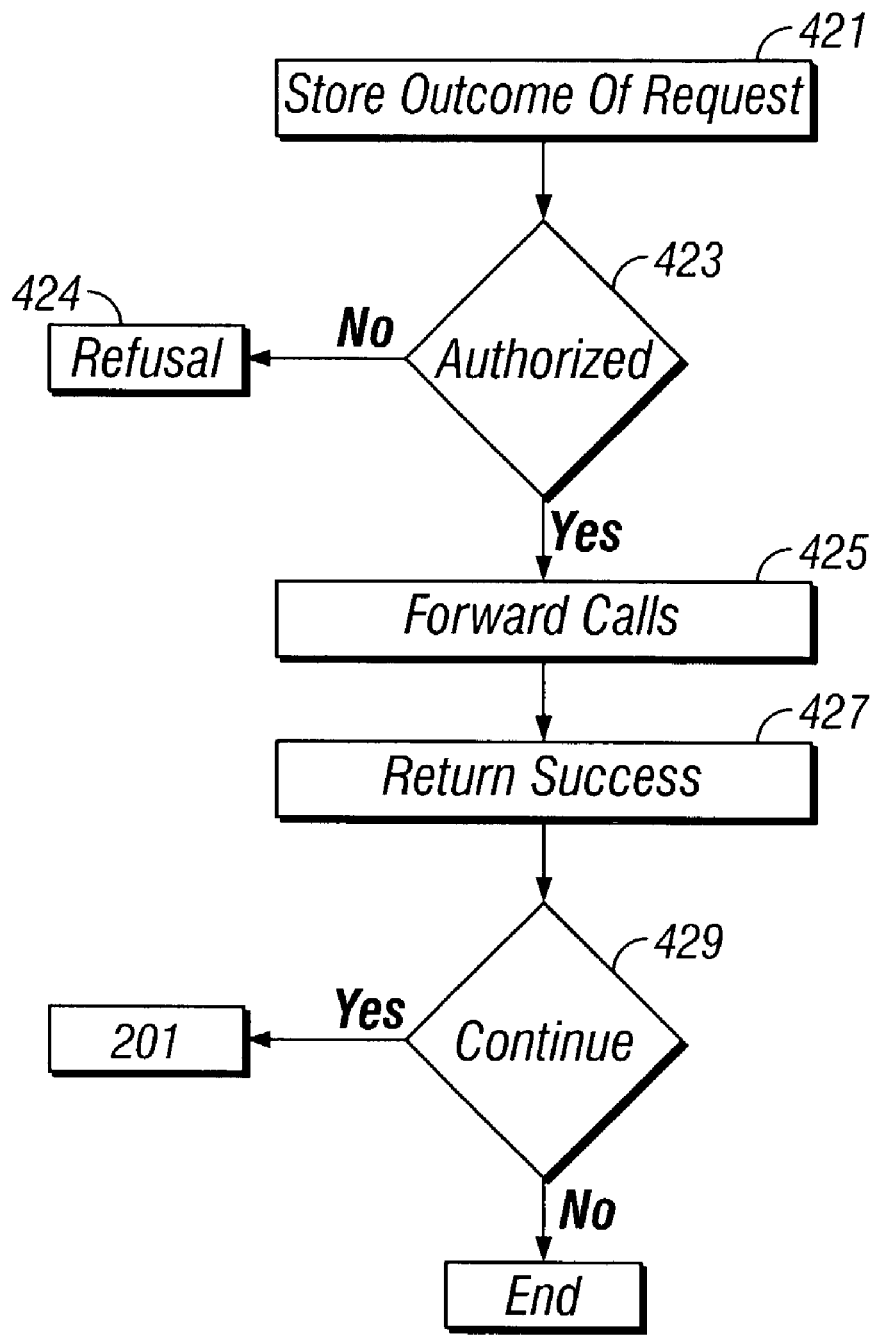
Figure 8C:
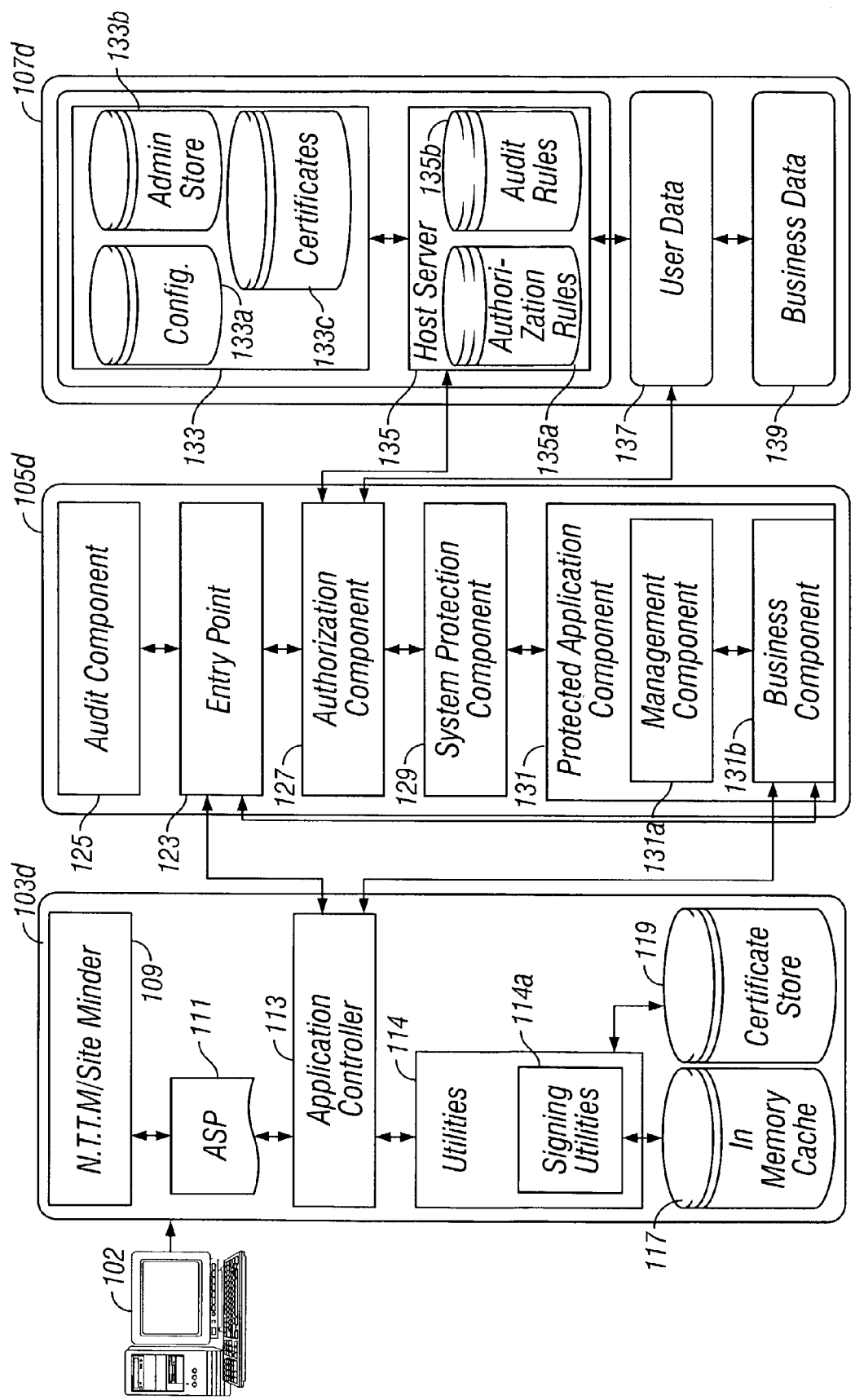
FIG. 8c is a system schematic that illustrates the interaction between the entry point component, the authorization component, a system protection component and the other components described in FIGS. 8a and 8b in accordance with the invention.
Figure 9:
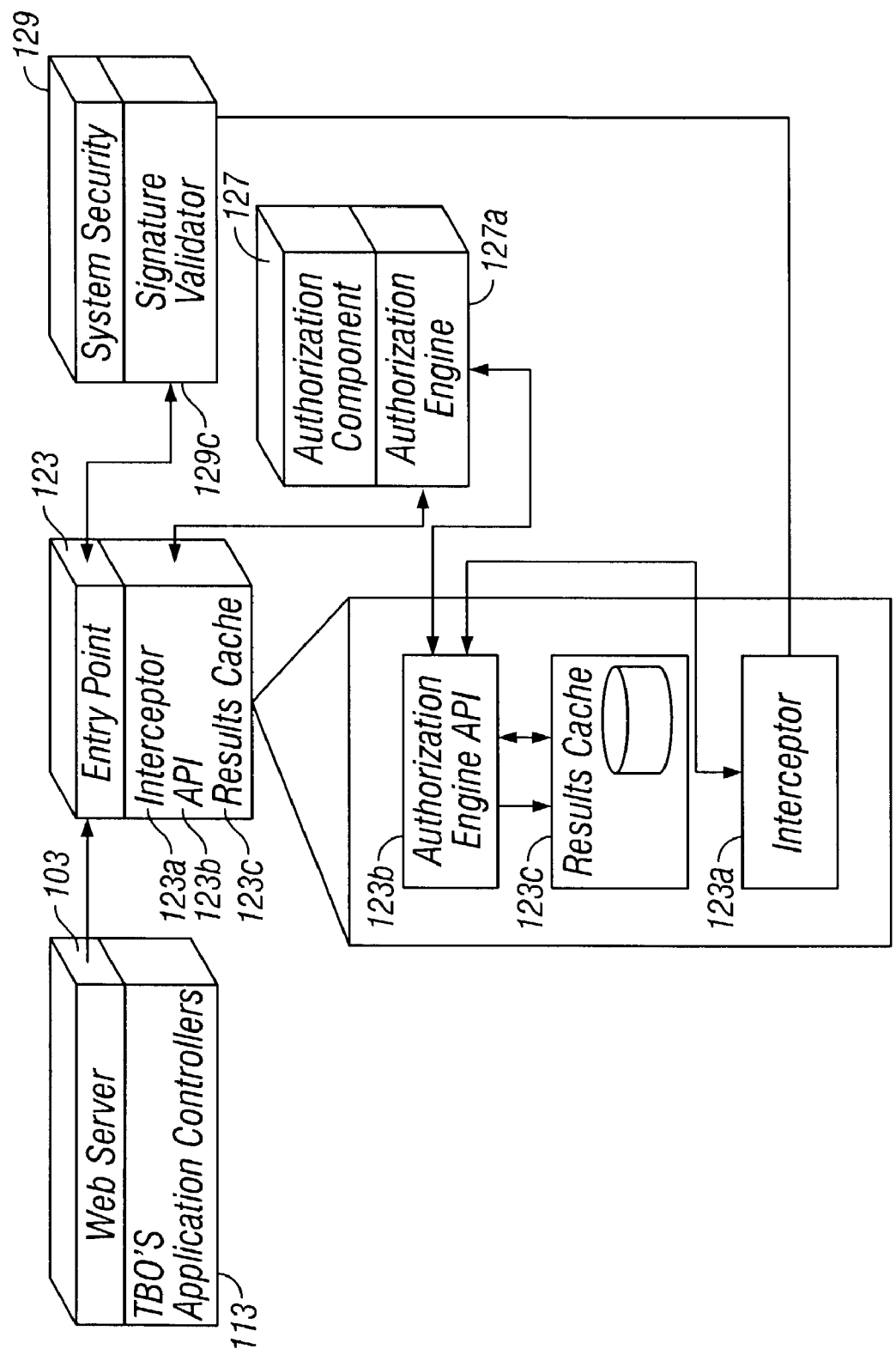
FIG. 9 is a sub-component schematic that depicts the interaction between an entry point component, an authorization component, a system protection component and all other components as described in FIGS. 8a and 8b in accordance with the invention.

FIGS. 8a, 8b, 8c and 9 illustrate the interaction between the entry point component, the authorization component, the system protection component and the other components in the computer network system. FIGS. 8a and 8b are flow charts that depict the interaction between the entry point component, the authorization component, the system protection component and the other components in the computer network system. FIG. 8c is a system schematic that illustrates the interaction between the entry point component, the authorization component, the system protection component and the other components described in FIGS. 8a and 8b. FIG. 9 is a sub-component that depicts the interaction between an entry point component, an authorization component and all other components as described in FIGS. 8a and 8b.

Referring to FIG. 8a, this flow chart continues from 207 described in FIG. 5. At 401, application controller 113, preferably, formats the method call or request from 207, which is the inter account transfer request or rule creation request, into a SOAP (XML/RPC) message and sends it via HTTP to the application server 105. Preferably, the message is received by the interceptor program 123a, which is transmitted to authorization component 127 for verification or authorization as shown in FIG. 8c.

Referring to FIG. 8c, itnterceptor program 123a, as described above, extracts all the attributes of the request, such as the identity information of the user and calls the authorization API 123b to determine if there is authorization for the request.

Referring to FIG. 8a, at 403, authorization API 123b, preferably, checks the results cache 123c to determine if the same method call (inter-account transfer from the same user (authenticated) with the same attributes, for example $2,000.00, was already performed or checked in the past as shown in FIG. 9. Referring to FIG. 9, entry point component 123 includes an authorization API 123b, results cache 123c and interceptor program 123a. Authorization API 123b allows various users at user computers, such as the user at computer 102, make direct authorization calls. Interceptor program 123a, as described above, extracts from the request all the identity information of the user. The extracted attributes are compared with the rules in the rules store.

API 123b enables calls to the authorization engine 127a to check the results cache 123c to determine if the request should be authorized based on the rules in the rules store. Results cache 123c contains the recently requested authorization results from audit data store 135b and authorization data store 135a returned from the authorization engine 127a. Interceptor program 123a captures SOAP messages or requests sent to the application server 105, and then interceptor program 123a verifies the signature of the request and calls the API 123b. API 123b checks with authorization engine 127a to verify if the request should be authorized.

Referring to FIG. 8a, at 403, if the same method call or request was submitted in the past, then this process skips to 419. If the same method call was not submitted in the past, then this process continues at 405. At 405, authorization API 123b cannot find the same method call or request in the results cache 123c. Preferably, results cache 123c reports to the authorization engine 127a that the method calls or request is not there. At 407, authorization engine 127a checks the rule cache 127b to determine whether the rules associated with the particular method call have been retrieved in the past. If the rules associated with the particular method call were used in the past, then the process skips to 413. If the rules were not used in the past, then the process continues to 409.

At 409, authorization engine 127a retrieves the rules for the method from the rules store of audit data store 135b and authorization data store 135a as shown in FIG. 8c. The rules, as described above, for audit data store 135b and authorization data store 135a may have certain restrictions, such as the type of transaction the user can request, the time the user can request the transaction, the group that can request the transaction and any of the rules in the rules store, described above.

Referring to FIG. 8a, at 411, the authorization engine 127a, stores the retrieved rules in a rules cache. At 413, authorization engine 127a checks a returned data cache to determine if all the data necessary to evaluate the attribute of the request, such as rules for the user and other attributes were retrieved in the past. If the attributes of the request were retrieved in the past, then the process skips to 419. Alternatively, if the attributes of the request were not retrieved in the past, then the process continues at 415.

At 415, the authorization engine 127a retrieves back-end directories or databases, such as the ones in user database 137 to evaluate the attribute rules as shown in FIG. 8c. At 417, authorization engine 127a stores the retrieved user attributes in the returned data cache. At 419, authorization engine 127a compares the attributes of the request with the rules in the rules store to determine from the results if the request should be authorized. For example, the rule may not allow the user to withdraw more than a certain amount of money, for example $500.00 from a savings account per day, or the user may be a family member (for a family account) who can make deposits into a savings account but not withdrawals from the account.

Authorization engine 127a returns the results to the API 123b. The results reveal whether the request should be authorized or refused.

Referring to FIG. 8b, at 421, API 123b stores the outcome of the results, if the request is authorized or refused in the results cache 123c. At 423, API 123b, preferably, returns the decision to the interceptor program 123a. At 424, if refused, the interceptor program 123a discards the method call or request, returns a refusal status to the calling application controller, which is sent to the user at computer 102. The message may be any type of conventional message that says, "You are not allowed to perform this transaction." At this point, the user may reinitiate the program at 201.

At 425, if authorized, interceptor program 123a forwards the method call to the appropriate business component 131b for execution and continues at 425. At 425, the business component 131b, preferably, executes the method call or request when it interacts with back-end data sources, such as the databases on data server 107 as needed.

At 427, the business component 131b, preferably, returns a success status to the calling application controller 113 as shown in FIG. 8c. Application controller 113, preferably, transmits a response by SOAP, XML or RPC message to the user at computer 102 that the request has been performed. For example, the application controller can send an electronic mail (e-mail) message that states: "Your request has been performed." Then, at 429, the user can decide if he wants to reinitiate the process or end. If the user wants to end the process, then he simply uses any conventional means to disconnect from the web server 103, application server 105 and data server 107. If the user chooses to continue, then he can use any conventional means to return to 201.

FIGS. 10a, 10b and 10c illustrate the interaction between the audit component, the authorization component and other components in the computer network system. FIG. 10a is a flow chart that depicts the interaction between the audit component, the authorization component and other components in the computer network system. FIG. 10b is a system schematic that illustrates the interaction described in FIG. 10a. FIG. 10c is a sub-component that depicts the interaction described in FIG. 10a.

Referring to FIG. 10a, the flow chart continues from 401 described in FIG. 8a. At 501, interceptor program 123a calls for authorization engine 127a to authorize the method call or request, as shown in FIG. 10b.

Referring again to FIG. 10a, at 503, each of the subsystems entry point component 123, authorization component 127, protection component 129 and management component 131 can send a formatted log entry or request to a local logging queue 125a in audit component 125 as shown in FIG. 10c. In FIG. 10c, the logging queue 125a stores incoming log information. In addition, the logging queue 125a is a centralized queuing mechanism that receives the log information from all of the components in application server 105. The log entries in the logging queue 125a are removed as the audit rule evaluator 125b processes the entries.

Audit rules store 135b or logging cache 126 houses the audit rules. In the preferred embodiment, the audit rule evaluator 125b determines which items in the logging queue should be recorded. In addition, it reviews and evaluates the log entries that are retrieved from the logging queue 125a. Further, the audit rule evaluator 125b compares the entries to rules from the rules store to determine if they should be recorded, and the location where they should be stored.

The logging component 125c writes the log information to the appropriate component audit repositories. Since the system does not provide a centralized logging and audit store, the application area must provide and manage these stores. In the preferred embodiment, the logging component 125c is responsible for storing entries to the audit stores on audit data store 135b.

Preferably, the entry point component 123 logs the request for an inter-account transfer of any sum, for example $2,000.00 from checking to savings account, together with the user's identity and the application identity extracted by interceptor program 123a as described in FIG. 9. Authorization component 127 logs whether the request was authorized or refused in the logging queue 125a.

Referring to FIG. 10a, at 505, the local logging queue 125a, allows authorization processing to continue without waiting for log entry handling to be completed. Log entries are forwarded asynchronously to the logging queue 125a. At 507, an audit rule evaluator 125a in audit component 125 retrieves at least one log entry from the logging queue 125a.

At 509, audit rule evaluator 125b, preferably, checks a logging rule cache 126 to determine if the rules associated with the type of log entry (method call for an inter-account transfer) have been retrieved in the recent past. If it is determined that the rules associated with the type of log entry were retrieved in the past, then this process skips to 515.

If there is a determination that the rules associated with the type of log entry were not retrieved in the past, then this process goes to 511. At 511, audit rule evaluator retrieves the rules for the log entry type from the audit data store 135b. At 513, audit rule evaluator, preferably, stores the retrieved rules in the logging rule cache 126.

At 515, audit rule evaluator 125b determines whether the log entry should be recorded. For example, the rules might specify that a request for an inter-account transfer is recorded only when the amount is $200 or greater. If the log entry should not be recorded, then it is simply discarded at 517. The user may be notified that the request or log entry was discarded by a SOAP message from API 123b, which receives the message from the logging queue 125a. API 123b, preferably, returns the results to the application controller 113, which returns the results to the web application of web server 103. For example, the web application includes a display that allows the recording of the transfer of funds or it will include a display that says there is no authorization to transfer funds at this amount or no authorization to transfer funds.

At 519, if the log entry should be recorded, the audit rule evaluator 125b forwards the log entry to the logging component 125c. Preferably, logging component 125c stores the log entry to the data stored specified by the logging rules. The user may be notified that the request was accepted by a SOAP message from API 123b, which receives the message from the logging queue 125a. Preferably, API 123b returns the results to the application controller 113, which returns the results to the web application of web server 103. The web application displays the message "You request was accepted." For example, the web application includes a display that says, "Transfer of funds is allowed."

FIGS. 11a and 11b illustrate the interaction between the components in the computer network system when the components receive a digitally signed request. FIG. 11a is a flow chart that depicts the interaction between the components in the computer network system when the components receive a digitally signed request. FIG. 11b is a system schematic that illustrates the interaction described in FIG. 11a.

Referring to FIG. 11a, the flow chart continues from reference numeral 205 described in FIG. 4. At 601, application controller 113, preferably, formats the method call into a SOAP, XML or RPC message (any type of Internet message). Preferably, this message includes all the attributes associated with the request, such as the user identity, the application identity, the inter-account transfer request, and any other attributes associated with the request.

Preferably, application controller 113 calls for signing utility 114a to digitally sign the SOAP message, in order to guarantee the request is being sent from an authenticated application controller and not from a hacked component or an outside source.

At 603, signing utility 114a, preferably, determines if the in-memory cache 117 includes a digital signing token for application controller 113. In order to guard against brute-force crypto analytic attacks, a signing token has a limited lifetime after which a new token must be created. Preferably, signing tokens are per-application controller, not per-user, so the performance requirement to create new tokens does not depend on the number of users, only on the number of application controllers in use. A determination is made if a current signing token is available for application controller 113. If the token is available, then the process skips to 619. If there is no signing token available, then the process continues at 605.

At 605, preferably, signing utility 114a retrieves a digital certificate for application controller 113 from the certificate store 119. At 607, by using the digital certificate signing utility 114a establishes a Secure Sockets Layer (SSL) connection to the token generator 129a and requests a new signing token for application controller 113 as shown in FIG. 11b. At 609, token generator 129a, preferably, determines, compares or verifies the digital certificate of the application controller 113 against the back-end certificate store 119. At 610, if the verification fails, then the request for a new signing token is refused and the user may be informed of the failure by any conventional means, such as by transmitting a SOAP message from application controller 113 to web server application of web server 103, as described above. The display on the web server application may state: "You are not authorized" or "System is not working, call help desk."

If the verification is successful, then, at 611, the token generator 129a creates a new signing token and stores it in signing token store 129c in protection component 129. At 613, token generator 129a returns the signing token to signing utility 114a. At 615, signing utility 114a, stores the signing token for the application controller 113 in the in memory cache 117.

At 617, signing utility 114a returns a signature for the SOAP message to the application controller 113. At 619, application controller 113 incorporates the signature into the SOAP, XML or RPC message and sends it via HTTP to application server 105. This message is received by interceptor program 123a as shown in FIG. 11b.

At 621, interceptor program 123a forwards the message with digital signature to the signature validator 129b. At 623, signature validator 129c uses the signature and the stored signing token to verify the message. At 625, signature validator 129b returns the signature decision, valid or invalid to the interceptor program 123a. At 627, the interceptor program 123a, preferably, sends a message to application controller 113, then the controller sends a SOAP message to the user at computer 102 of whether the signature is valid or invalid, by the methods described above. At 629, the user can decide if he wants to continue the process or another process at 205 or end the process at 628.

FIGS. 12a and 12b illustrate the interaction between the components in the computer network system when the components receive a request to modify an authorization rule. FIG. 12a is a flow chart that depicts the interaction between the components in the computer network system when the components receive a request to modify an authorization rule. FIG. 12b is a system schematic that illustrates the interaction described in FIG. 12a.

Referring to FIG. 12a, at 701a user initializes the process of transmitting a request by activating computer 102 to connect through network 101 to web server 103 as shown in FIG. 12b. The user may utilize any input device 102e to initialize a connection with web server 103 by any conventional means or methods known to those of ordinary skill in the art.

In this embodiment, the at least one request concerns an Application Privilege Administrator (APA) for a banking application who accesses web server 103 to use a web browser, run a script or create or modify an authorization rule for an application. For example, the APA for the banking application may create a new rule that only the primary account holder can withdraw funds from a savings account. The attributes of the request includes: the APA identification information and the specific banking application.

Referring to FIG. 12a, at 703, the APA, preferably, is authenticated by NTLM/SiteMinder 109 authentication program before the request is allowed to reach a web application page associated with web server 103. NTLM/SiteMinder 109 or another authentication program may authenticate the user by utilizing the methods discussed above. If the user is able to enter a correct password upon connecting with web server 103, then the user can utilize web server 103. At 704, if the user does not enter a correct password upon connecting with web server 103, then the connection is halted and the authentication process ends.

At 705, NTLM/SiteMinder 109, preferably, transmits the request to ASP 111, where ASP 111 creates an application controller object. At 707, the application controller, preferably, object creates instances of application controllers 113 and uses them to make method calls or requests to perform privileged administration actions on the application server 105; in this case, creation of a new rule for a specific banking application.

At 709, application controller 113 formats the method call (rule creation request) from the application controller into a SOAP (or XML/RPC) message and sends it via http to the application server 105. The message is received by the interceptor program 123a in the authorization entry point 123 of application server 105 for authorization checking. Interceptor program 123a extracts the attributes of the requests in order to compare the attributes with the rules in the audit data store 135b and the authorization data store 135a.

At 711, interceptor program 123a invokes authorization engine 127a for authorization of the method call (rule-creation request). At 713, authorization engine 127a retrieves the rules governing creation of authorization rules for the specific banking application from the rules store in authorization component 127, audit data store 135b and authorization data store 135a as shown in FIG. 12b.

At 715, authorization engine 127a retrieves administrative privileges for the authenticated APA and the administration store 133b in data server 133 as shown in FIG. 12b. Authorization engine 127 compares the authorization rules with the attributes of the request to determine if the request is authorized, by the methods described above.

At 717, authorization engine 127a returns the decision, authorized or refused to the interceptor program 123a. In this case, the authenticated APA must have been delegated the privilege to create authorization rules for the specified banking application from at least one store in user database 137.

If the request is not authorized, it is discarded, as shown at 719. At 721, the refusal is transmitted to application controller 113. At 723, application controller 113 transmits the refusal by SOAP message to the user at computer 102. Then the user may end this process, reinitiate the process or initiate another process.

At 725, if the request is authorized, then the interceptor program 123*a* forwards the method call (rule-creation request) to management component 131*b*. The acceptance of the request is forwarded in a SOAP message from application controller 113 to the user at computer 102, as described above. The user may decide to initiate the process again at 201 or end the process, as described above. The new rule is stored in rules store authorization component 127, audit data store 135*b* and authorization data store 135*a*.

FIGS. 13*a* and 13*b* illustrate the interaction between the components in the computer network system when the components receive a request to manage the entire computer network system. FIG. 13*a* is a flow chart that depicts the interaction between the components of the computer network system when the components receive a request to manage the entire computer network system. FIG. 13*b* is a system schematic that illustrates the interaction described in FIG. 13*a*.

Referring to FIG. 13*a*, at 801, a user initializes the process of transmitting a request by activating computer 102 to connect through network 101 to web server 103. In this embodiment, for the request a system administrator accesses web server 103 to use a web browser, or runs a script to administer the management of the entire system. For example, a system administrator may define a name space (and its corresponding source connection string) to be used in authorization rules. The attributes of the request includes: system administrator identification attribute and administer the management of the entire system attribute.

At 803, the system administrator, preferably, is authenticated by NTLM/SiteMinder authentication program 109 before the request is allowed to reach a web application page associated with web server 103. Preferably, NTLM/SiteMinder 109 authenticates the user of web server 103 by utilizing the methods discussed above. At 804, if the user does not enter a correct password, then the connection is halted and the authentication process ends. If the user is able to enter a correct password upon connecting with web server 103, then web server 103 can receive the request and continue at 805. At 805, NTLM/SiteMinder 109 transmits the request to ASP 111, where ASP 111 creates an application controller object. At 807, the application controller object, preferably, initiates instances of application controllers 113 and uses them to make method calls to perform system administration actions on the application server 105; in this case, the system administration actions include the creation of a new namespace to be used in the authorization data store 135*a*.

At 809, application controller 113, preferably, formats the method call (namespace-creation request) from the application controller into a SOAP (or XMURPC) message and sends it via http to the application server 105. The message is received by the interceptor program 123*a*, preferably, at the entry point 123 of application server 105 for authorization. Interceptor program 123*a*, preferably, extracts the attributes of the request in order to determine if the request is authorized as shown in FIG. 13*b*.

Referring to FIG. 13*a*, at 811, interceptor program 123*a*, preferably, invokes authorization engine 127*a* for authorization of the method call (namespace creation request). At 813, authorization engine 127*a*, preferably, retrieves the rules governing creation of namespaces from the administration store 133*b*. Authorization engine 127*a*, preferably, retrieves the rules governing creation of namespaces from the administration store 133*b*. In this case, rules are held in the administrative store 133*b*, not the rules store or audit data store 135*b* and authorization data store 135*a*, for security purposes.

At 815, authorization engine 127*a*, preferably, retrieves administrative privileges for the authenticated system administration from the administration store 133*b* as shown in FIG. 13*b*. Authorization engine 127, preferably, compares the authorization rules with the attributes of the request, then, at 817, authorization engine 127*a*, preferably, returns the decision, authorized or refused, to the interceptor program 123*a*. In this case, the authenticated system administrator must have been delegated the privilege to create namespaces for the system.

If the request is refused, then at 818, interceptor program 123*a* discards the request and transmits a refusal status to the application controller 113 as shown in FIG. 13*b*. At 820, application controller 113 transmits the SOAP message through web server 103 to computer 102, where the web application on web server displays the message "You are not authorized" or "System is not working, call the help desk." At 822, the user may reinitiate the whole process at 801 or initiate another process at 201 by any conventional means. The user may also end the program at 824 by any conventional means.

If the request is authorized, then the interceptor program 123*a* forwards the method call (namespace creation request) to the management component 131*b*. At 819, the management component stores the definition of the new namespace in the configuration store 133*a*. Preferably, a SOAP message is sent from the interceptor program 123*a* to the application controller 113, where the application controller 113 transmits a message to the user that the request is authorized. The display may state "Your request is accepted." Preferably, the user may receive the same kind of display notification, as described above, on the web application of web server 103 that the request has been authorized. The user may decide to reinitiate the process or another process or end the program, as described above.

In summary, the present invention provides a system that secures access to an application by performing authorization of action requests based on authorization rules contained in a data store. This system allows a user to implement and manage authorization access controls in a relatively simple and convenient manner external to applications on the web browser and application server. The authorization of the action requests, which occurs external to the application being secured, is dynamically performed based on rules which employ combinatory and comparison logic of user attributes, resource attributes, and action attributes.

Variations and modifications of the disclosed embodiments of the invention may be made without departing from the scope of the invention. The aforementioned description is intended to be illustrative rather than limiting and that it be understood that it is the following claims and their equivalents, set forth the scope of the invention.

The invention claimed is:

1. A system for authorizing access to an application on a protected computer network, the system comprising:
   a web server configured to receive a request;
   an application server connected to the web server; and
   a rules store in a data store connected to the application server,
   wherein the application server is configured
      to receive the request from the web server,
      to extract different types of attributes from the request,
      to retrieve at least one rule from the rules store for a user identification attribute of the different types of attributes, to compare the user identification attribute of the request with an element of user specific information associated with the at least one retrieved rule for the user identification attribute, if the user identification attribute is determined to be authorized based on the comparison, to retrieve at least one rule from the rules store for a money attribute of the different types of attributes, to compare the money attribute of the request with an element of a custom resource associated with the at least one retrieved rule for the money attribute, if the money attribute is determined to be authorized based on the comparison, to combine the user identification attribute and the money attribute, to compare the combined attributes with a logical operator retrieved from the rules store, and to determine whether the combined attributes meet the operator to authorize the request.

2. The system of claim 1 wherein the application server is configured to execute the request, if the request is authorized.

3. The system of claim 1 further comprising an entry point component in the application server, wherein the entry point component is configured to extract the attributes from the request to determine if the request is authorized.

4. The system of claim 1 wherein the rules store comprises audit rules.

5. The system of claim 1 wherein the rules store comprises authorization rules.

6. The system of claim 5 wherein the rules store comprises a combination of operators and elements.

7. The system of claim 6 wherein the operators comprise logical operators.

8. The system of claim 6 wherein the operators comprise context operators.

9. The system of claim 6 wherein the elements comprise user specific information.

10. The system of claim 6 wherein the elements comprise action/request specific information.

11. The system of claim 1 wherein the request is transmitted in a Hypertext Transfer Protocol (HTTP).

12. The system of claim 11 wherein the HTTP comprises a simple object access protocol (SOAP) formatted message.

13. The system of claim 3 further comprising a data server connected to the application server, wherein the data store is included in the data server.

14. The system of claim 1 wherein the application server is configured to transmit a notification function.

15. The system of claim 1 wherein the request is an application action request.

16. A method for authorizing access to an application on a protected computer network, the method comprising:

receiving a request;

extracting different types of attributes from the request;

retrieving at least one rule for a user identification attribute of the different types of attributes;

comparing the user identification attribute with an element of user specific information associated with the at least one rule for the user identification attribute;

if the user identification attribute is determined to be authorized based on the comparison, retrieving at least one rule for a money attribute of the different types of attributes;

comparing the money attribute of the request with an element of a custom resource associated with the at least one retrieved rule for the money attribute;

if the money attribute is determined to be authorized based on the comparison, combining the user identification attribute and the money attribute;

comparing the combined attributes with a logical operator retrieved from the rules store; and authorizing the request if the extracted different types of attributes meet the at least one retrieved rules based on the comparisons.

17. The method of claim 16 further comprising executing the request, if the request is authorized.

18. The method of claim 16 wherein an entry point component is configured to extract the different types of attributes from the request.

19. The method of claim 16 wherein the extracted different types of attributes comprise an identity of an application making the request.

20. The method of claim 16 wherein the extracted different types of attributes comprise an identity of a user making the request.

21. The method of claim 19 wherein the extracted different types of attributes comprise an amount of money.

22. The method of claim 19 further comprising managing the rule in the rules store.

23. The method of claim 22 wherein the rule is managed by a management component.

24. An application server comprising:

an entry point component configured to receive a request, wherein the entry point component is configured to extract different types of attributes from the request; and an authorization component coupled to the entry point component, wherein the entry point component is configured to transmit the extracted different types of attributes to the authorization component, and wherein the authorization component is configured, to retrieve at least one rule for a user identification attribute of the different types of attributes from a rules store, to compare the user identification attribute with the at least one rule for the user identification attribute, if the user identification attribute is determined to be authorized based on the comparison, to retrieve at least one rule from the rules store for a money attribute of the different types of attributes, to compare the money attribute of the request with an element of a custom resource associated with the at least one retrieved rule for the money attribute, if the money attribute is determined to be authorized based on the comparison, to combine the user identification attribute and the money attribute, and to compare the combined attributes with a logical operator retrieved from the rules store to authorize the.

25. The application server of claim 24 wherein the authorization component is configured to execute the request, if the request is authorized.

26. The system of claim 1 wherein the application server is configured so that authorization of the request occurs external to the application.

27. The method of claim 16 wherein the authorizing the request occurs external to the application.

28. The system of claim 1, wherein two of the extracted different types of attributes are selected from the group consisting of an identity of an application making the request, an identity of a user making the request, a method to be invoked, parameters associated with the request, a time and a specific amount of money.

29. The system of claim 1, wherein two of the extracted different types of attributes are selected from the group consisting of an identity of an application making the request, a method to be invoked, parameters associated with the request, and a time.

30. The system of claim 1, wherein the extracted different types of attributes comprise an identity of a user making the request, a time and a specific amount of money.

31. The method of claim 16, wherein two of the extracted different types of attributes are selected from the group consisting of an identity of an application making the request, an identity of a user making the request, a method to be invoked, parameters associated with the request, a time and a specific amount of money.

32. The method of claim 16, wherein two of the extracted different types of attributes are selected from the group consisting of an identity of an application making the request, a method to be invoked, parameters associated with the request, and a time.

33. The method of claim 16, wherein the extracted different types of attributes comprise an identity of a user making the request, a time and a specific amount of money.

34. The application server of claim 24, wherein two of the extracted different types of attributes are selected from the group consisting of an identity of an application making the request, an identity of a user making the request, a method to be invoked, parameters associated with the request, a time and a specific amount of money.

35. The application server of claim 24, wherein two of the extracted different types of attributes are selected from the group consisting of an identity of an application making the request, a method to be invoked, parameters associated with the request, and a time.

36. The application server of claim 24, wherein the extracted different types of attributes comprise an identity of a user making the request, a time and a specific amount of money.

* * * * *